US012518934B2

(12) United States Patent
Enger et al.

(10) Patent No.: US 12,518,934 B2
(45) Date of Patent: Jan. 6, 2026

(54) ROTARY CIRCUIT BREAKER LOCKOUT SYSTEM AND METHOD

(71) Applicant: Brady Worldwide, Inc., Milwaukee, WI (US)

(72) Inventors: Andrew N. Enger, Muskego, WI (US); Gene Gladkov, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 222 days.

(21) Appl. No.: 18/464,067

(22) Filed: Sep. 8, 2023

(65) Prior Publication Data

US 2025/0087431 A1 Mar. 13, 2025

(51) Int. Cl.
*H01H 9/28* (2006.01)
*H01H 9/02* (2006.01)
*H01H 11/00* (2006.01)

(52) U.S. Cl.
CPC ................ *H01H 9/28* (2013.01); *H01H 9/02* (2013.01); *H01H 11/00* (2013.01)

(58) Field of Classification Search
CPC ............ H01H 9/28; H01H 9/02; H01H 11/00; H01H 9/282; H01H 9/286; H01H 9/287; H01H 9/283
See application file for complete search history.

(56) References Cited

U.S. PATENT DOCUMENTS 5,300,740 A 4/1994 Benda
5,500,495 A 3/1996 Benda et al.
5,543,593 A 8/1996 Turek
6,649,851 B1 11/2003 Hennel et al.
6,703,572 B1 3/2004 Broghammer
6,791,040 B1 9/2004 Puhalla et al.
7,262,376 B2 8/2007 Brojanac et al.
7,501,593 B2 3/2009 Brojanac
(Continued)

FOREIGN PATENT DOCUMENTS

CN 110047669 B 6/2023
DE 102008028049 B3 8/2009

OTHER PUBLICATIONS

Grainger, "Schneider Electric Padloc", https://www.grainger.com/product/5B541?gucid=N:N:PS:Paid:GGL:CSM-2295:4P7A1P:20501231&gclid=CjwKCAjwhdWkBhBZEiwA1ibLmLOzbs9uF31Y7a1lleVhnSytpu6O5osRiupwxLhf5Xnn-qxwek1-IRoC6zIQAvD_BwE&gclsrc=aw.ds, Accessed Sep. 15, 2023, 1 page.

(Continued)

*Primary Examiner* — Lheiren Mae A Caroc
(74) *Attorney, Agent, or Firm* — Husch Blackwell LLP

(57) ABSTRACT

A lockout device for securing a rotary circuit breaker switch is provided. The lockout device is provided in the form of an outer housing having a plurality of side walls extending away from a base wall to define a cavity and at least one of the side walls having a slot formed therein. The lockout device further includes an inner housing received within a portion of the cavity. The inner housing has a first component and a second component to receive the rotary circuit breaker switch therein. The lockout device has a biasing element positioned between the base wall and the inner housing to translate the inner housing axially relative to the outer housing, and a fastener with a thumbwheel having at least one projection designed to be positioned within the slot of the outer housing to hold the fastening mechanism and the lockout device in a locked position.

19 Claims, 35 Drawing Sheets

(56) References Cited

U.S. PATENT DOCUMENTS

| | | | | |
|---|---|---|---|---|
| 8,629,359 | B2 | 1/2014 | Hackett | |
| 9,208,964 | B2 | 12/2015 | Dudgeon et al. | |
| D808,347 | S | 1/2018 | Benda et al. | |
| 10,354,812 | B1 | 7/2019 | Enger et al. | |
| D914,618 | S | 3/2021 | Neau et al. | |
| 11,004,624 | B2 * | 5/2021 | Riepe | H01H 9/283 |
| 11,101,094 | B2 | 8/2021 | Guy | |
| D934,819 | S | 11/2021 | Enger et al. | |
| 11,456,125 | B2 | 9/2022 | Lind et al. | |
| 11,651,913 | B1 | 5/2023 | Shiravi | |
| 2004/0040824 | A1 | 3/2004 | Benda | |
| 2006/0266631 | A1 | 11/2006 | Kalous et al. | |
| 2014/0102865 | A1 | 4/2014 | Obenshain et al. | |
| 2014/0165384 | A1 | 6/2014 | Dudgeon et al. | |
| 2016/0336122 | A1 | 11/2016 | Benda et al. | |
| 2021/0110982 | A1 | 4/2021 | Lind et al. | |

OTHER PUBLICATIONS

Zoro, "Machine Lockout", https://www.zoro.com/zoro-select-machine-lockout-clear-14-dia-max-number-of-padlocks-1-45mz95/i/G1011733/?utm_source=google&utm_medium=surfaces&utm_campaign=shopping%20feed&utm_content=free%20google%20shopping20clicks&gclid=CjwKCAjwhdWkBhBZEiwA1ibLmHTzYYQkltAKII4ILHlyEl7sczotT6_3f2_gxWnyvjUSy5llZzq_HBoC29wQAvD_BwE, Accessed Sep. 15, 2023, 1 page.

Grainger, "Zing Control Panel Lockout", https://www.grainger.com/product/61UJ10?gucid=N:N:PS:Paid:GGL:CSM-2295:4P7A1P:20501231&gclid=CjwKCAjwhdWkBhBZEiwA1ibLmEgb73JOLcArmZe3xBgigPUrHhd-_ee9t5VUA7OYi0t7Hib3ViYI_BoCBYMQAvD_BwE&gclsrc=aw.ds, Accessed Sep. 15, 2023, 1 page.

Brady, "Universal Mini Circuit Breaker Lockout", https://www.bradyid.com/lockout-tagout/universal-mini-circuit-breaker-lockout-cps-3385490, Accessed Sep. 15, 2023, 1 page.

Brady, "Snap-On Lockout with Cable", https://www.bradyid.com/lockout-tagout/circuit-breaker-lockouts/snap-on-lockout-cable-cps-2851466, Accessed Sep. 15, 2023, 1 page.

Brady, "Universal Multi-Pole Breaker Lockout", https://www.bradyid.com/lockout-tagout/circuit-breaker-lockouts/universal-multi-pole-breaker-lockout-cps-2851676, Accessed Sep. 15, 2023, 1 page.

EP Extended Search Report in European Application No. 24198878.1, dated Apr. 23, 2025, 12 pages.

* cited by examiner

ROTARY CIRCUIT BREAKER LOCKOUT SYSTEM AND METHOD

BACKGROUND

The present disclosure relates generally to a rotary circuit breaker lockout device. In particular, this disclosure relates to an apparatus that can be secured to a circuit breaker to selectively prevent the movement of a rotary circuit breaker switch.

Circuit breakers are electrical switches designed to protect electrical circuits from damage caused by current overload or short-circuiting. The circuit breaker can be manually placed in an "off" position, which prevents current from passing through the circuit. A lockout device may be used to facilitate maintaining a circuit breaker switch in a set or locked position.

Many circuit breakers function similarly but have varying shapes and sizes. It is important that a lockout device properly fits the circuit breaker to maintain the circuit breaker in a set or locked position. Some traditional lockout devices that are used with circuit breakers having flip switches may not fit well on circuit breakers having rotary switches due to the shape of the switch. In particular, some rotary switches are provided in the form of a round knob and a handle extending outwardly therefrom. The rotary switch can be rotated or turned by a user between an "on" position and an "off" position.

Traditional lockout devices used for flip switches do not prevent movement of the rotary switch, primarily because of the round shape of the rotary switch. Making a traditional lockout device larger to accommodate the round knob and handle prevents the lockout device from properly engaging the body of the circuit breaker and/or maintaining the circuit breaker switch in a locked position. Also, traditional lockout devices do not fit rotary switch circuit breakers properly because of the shape and protrusions on the bottom of the body of the rotary switch circuit breaker. A lockout device that is compatible with a rotary circuit breaker and maintains the rotary switch in its "locked" position to prevent movement of the rotary switch is desired.

SUMMARY

In some embodiments, a lockout device for securing a rotary circuit breaker switch is provided. The lockout device is provided in the form of an outer housing with a plurality of side walls extending away from a base wall formed on one axial end of the outer housing to define a cavity and at least one of the side walls with a slot formed therein. The lockout device further includes an inner housing received within a portion of the cavity. The inner housing has a first shell component and a second shell component spaced apart from one another and designed to receive the rotary circuit breaker switch therein. The lockout device has a biasing element positioned between the base wall and the inner housing to translate the inner housing axially relative to the outer housing. The device further includes a fastening mechanism with a thumbwheel having at least one projection designed to be positioned within the slot of the outer housing to hold the fastening mechanism and the lockout device in a locked position.

The lockout device further includes a support structure extending upwardly from the base wall of the outer housing and is designed to be inserted into the biasing element.

The inner housing may include a tab formed on one end of the inner housing that extends into a channel formed through the base wall of the outer housing. The tab includes an opening configured to receive a lock therein. The inner housing has a projection designed to engage at least a portion of a perimeter of a rectilinear window formed within at least one of the plurality of side walls of the outer housing, the projection being received within the window to constrain motion of the outer housing relative to the inner housing.

The thumbwheel is round with a plurality of projections extending outwardly therefrom, and the thumbwheel includes a tab to facilitate rotating at least one of the thumbwheel or the fastening mechanism. Further, the outer housing includes a collar designed to impart additional strength to the outer housing.

The biasing element is provided in the form of a spring. Additionally, at least one of the plurality of side walls has a channel formed therein to receive the inner housing and facilitate axially translating the outer housing with respect to the inner housing.

In one embodiment, a lockout device for securing a rotary circuit breaker switch is provided. The circuit breaker has a body with an upper surface and a lower surface. The lockout device includes an outer housing with a plurality of side walls extending away from a base wall formed on one axial end of the outer housing to define a cavity, and at least one of the side walls has a slot formed therein. The lockout device also includes an inner housing received within a portion of the cavity, and the inner housing has a first component with a first set of gripping projections designed to engage the upper surface of the body and a second component with a second set of gripping projections designed to engage the lower surface of the body, wherein the first component and the second component are spaced apart from one another and designed to receive the rotary circuit breaker switch therein. The device further has a biasing element positioned between the outer housing and the inner housing to translate the inner housing axially relative to the outer housing, and a fastening mechanism with a thumbwheel having at least one projection designed to be positioned within the slot of the outer housing to hold the fastening mechanism and the lockout device in a locked position.

In one embodiment, the lockout device further includes a first plate designed to couple to the first set of gripping projections, and a second plate is deigned to couple to the second set of gripping projections to facilitate gripping the inner housing to the circuit breaker. The first plate and/or the second plate is fabricated of at least one of metal, rubber, grip tape, or sandpaper. The first set and the second set of gripping projections has at least three substantially rectangular flanges. Alternatively, the first set of gripping projections has at least three substantially triangular projections and the second set of gripping projections has at least three substantially triangular projections.

In one embodiment, the inner housing further includes a tab formed on one end of the inner housing, whereby the tab extends into a channel formed through the outer housing when the inner housing and the outer housing are at least partially engaged. The tab has a lock receiving aperture therethrough, and the lock receiving aperture is sized to receive a lock, and the lock is provided in the form of a padlock. The outer housing is movable relative to the inner housing. against the bias of the biasing element, between an open position and a closed position, the tab extending through the channel axially further in the closed position than in the open position.

Further, in one embodiment, the inner housing has a tab that engages a perimeter of a window formed within at least one of the plurality of side walls, and the tab limits the axial movement of the outer housing with respect to the inner housing. The tab has a substantially triangular shape.

Additionally, in one embodiment, the fastening mechanism is a cylindrical screw with threads circumscribing the length of its body, and the thumbwheel couples to at least one end of the screw.

In one embodiment, the thumbwheel is round with a plurality of projections extending outward therefrom, and the thumbwheel includes a handle to facilitate rotating at least one of the thumbwheel and the fastening mechanism.

Further, in one embodiment, the outer housing includes a collar designed to impart strength and rigidity to the outer housing. The collar further engages at least one projection of the thumbwheel.

Additionally, in one embodiment, the biasing element is provided in the form of a spring.

In one embodiment, at least one of the plurality of side walls includes a channel formed therein to receive the inner housing and facilitate translating the outer housing with respect to the inner housing.

Also, in one embodiment, the plurality of side walls of the outer housing extend away from a base wall, and the lockout device further includes a support structure that extends upwardly from the base through a portion of the biasing element to secure the biasing element to the outer housing.

Moreover, in one embodiment, the inner housing includes a stopping element, with an opening within the stopping element, to receive at least a portion of the biasing element and the support structure within the opening.

In one embodiment, a method of assembling a lockout device for securing a rotary circuit breaker switch is provided. The method includes providing an outer housing with a plurality of side walls extending away from a base wall formed on one axial end of the outer housing to define a cavity, and at least one of the side walls has a slot formed therein and at least one of the side walls with a channel formed therein. The method further includes positioning an inner housing within a portion of the cavity, and the inner housing with a first component and a second component positioned apart from one another to receive the rotary circuit breaker switch therein, and at least one of the first component and the second component is designed to be guided by the channel of the outer housing. The method also includes coupling a biasing element between the base wall and the inner housing such that the biasing element translates the inner housing axially relative to the outer housing. The method additionally includes inserting a fastening mechanism having a thumbwheel with at least one projection within the slot of the outer housing to hold the fastening mechanism and the lockout device in a locked position.

In one embodiment, a method of securing a rotary circuit breaker switch of a circuit breaker using a lockout device is provided. The circuit breaker has an upper surface and a lower surface. The method includes providing an outer housing with a plurality of side walls defining a cavity and the at least one of the side walls has a slot formed therein. The method also includes positioning an inner housing within a portion of the cavity, and the inner housing has a first component and a second component. The method further includes engaging the first set of gripping projections with an upper surface of the body of the circuit breaker, and engaging the second set of gripping projections with a lower surface of the body of the circuit breaker. The method additionally includes positioning the rotary circuit breaker switch within a switch receiving recess formed by the first component and the second component, and translating the outer housing axially relative to the inner housing via a biasing element. The method also includes rotating a fastening mechanism with a thumbwheel having at least one projection until the at least one projection engages the slot of the outer housing to hold the fastening mechanism and the lockout device in a locked position.

In one embodiment, a lockout device for securing a rotary switch of a circuit breaker is provided. The circuit breaker includes a body with an upper surface and a lower surface. The lockout device includes an outer housing that defines a cavity and has a slot formed therein, and an inner housing is designed to be received within a portion of the cavity. The inner housing has a first gripping projection designed to grip the upper surface of the body of the circuit breaker and the inner housing also has at least one second gripping projection designed to grip the lower surface of the body of the circuit breaker. The first gripping projection and the at least one second gripping projection are positioned apart from one another to receive the rotary circuit breaker switch therein. The lockout device further includes a fastener with a thumbwheel. The thumbwheel has at least one projection designed to be positioned within the slot of the outer housing to hold the lockout device in a locked position.

In one embodiment, a method of securing a rotary circuit breaker switch of a circuit breaker is provided. The method uses a lockout device. The circuit breaker has an upper surface and a lower surface. The method includes providing an outer housing with a plurality of side walls defining a cavity and at least one of the side walls with a slot formed therein. The method also includes positioning an inner housing within a portion of the cavity. The inner housing has a first component with a first gripping projection and a second component has at least one second gripping projection. The method further includes positioning the inner housing adjacent the body of the circuit breaker. The method also may include contacting the first gripping projection with an upper surface of the body of the circuit breaker, engaging the second gripping projection with a lower surface of the body of the circuit breaker, positioning the rotary circuit breaker switch within a switch receiving recess formed by the first component and the second component, translating the outer housing axially relative to the inner housing via a spring, and rotating a fastener with a thumbwheel having a projection until the projection engages the slot of the outer housing to hold the fastener and the lockout device in a locked position.

In some embodiments, at least one first gripping projection extends vertically and/or downwardly from a body of the inner housing. For example, the first gripping projection extends from the first component of the inner housing. At least one first gripping projection is in the form of a rectangular flange. Moreover, at least one first gripping projection has at least one optional support element and a grip surface opposite the support element.

In another embodiment, the at least one second gripping projection extends vertically and/or downwardly from a body of the inner housing. For example, the second gripping projection extends from the second component of the inner housing. The at least one second gripping projection is a rectangular flange or a plurality of rectangular flanges, such as three rectangular flanges, with a void or space between each of the plurality of rectangular flanges. Moreover, the at least one second gripping projection has at least one optional second support element and a second grip surface opposite the second support element. The first gripping projection and the second gripping projection couple the rotary lockout device to circuit breakers of varying sizes.

Also, in some embodiments, the first component of the inner housing or the first gripping projection is a first block. The first block has a substantially rectangular body, and a plurality of jagged pointed triangular projections extend outward from the block. The first block and triangular projections couple the rotary lockout device to at least one surface of the circuit breaker. Further, in some embodiments, the second component of the inner housing or the second gripping projection is a second block. The second block has a substantially rectangular body, and a plurality of jagged pointed triangular projections extend outward from the second block. The second block and triangular projections couple the rotary lockout device to at least one surface of the circuit breaker.

DETAILED DESCRIPTION

Figure 1:
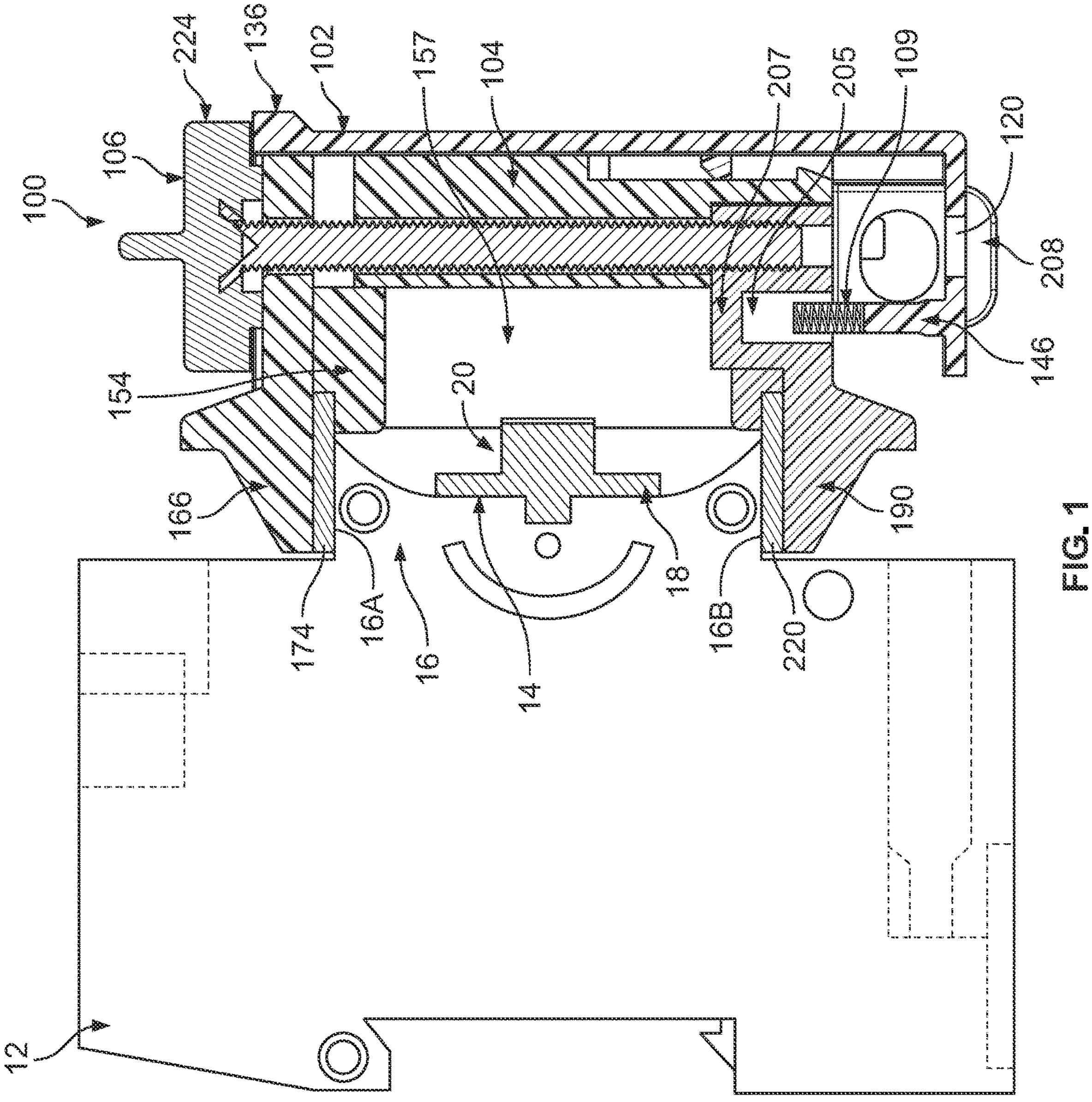
FIG. 1 illustrates a cross-sectional view of a rotary circuit breaker lockout device engaged with, but not yet fully locking out an exemplary rotary circuit breaker and without a lock.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Any numerical ranges disclosed herein include all values from, and including, the lower and upper values. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For purposes of clarity, the foregoing figures will be described using terms such as "rear," "back," "front," "top," "bottom," "right," "left," "side," "downward," "upward," or other types of directional language. The directional language used in the specification should not be considered limiting, as it is provided for descriptive purposes only. It should be understood that these terms are used within the specification only to promote understanding of the disclosure and refer only to the orientation of components shown in the provided figures. As will be appreciated by one of ordinary skill in the art, the lockout devices provided in the disclosure can be oriented in multiple orientations and directions and still remain effective at locking out circuit breakers.

The present disclosure provides devices and methods for locking out a circuit breaker provided in the form of a circuit breaker body and a circuit breaker switch. When installed, the lockout device can be secured to a circuit breaker switch and can engage a circuit breaker body to prevent rotation of the circuit breaker switch relative to the circuit breaker body.

Figure 1A:
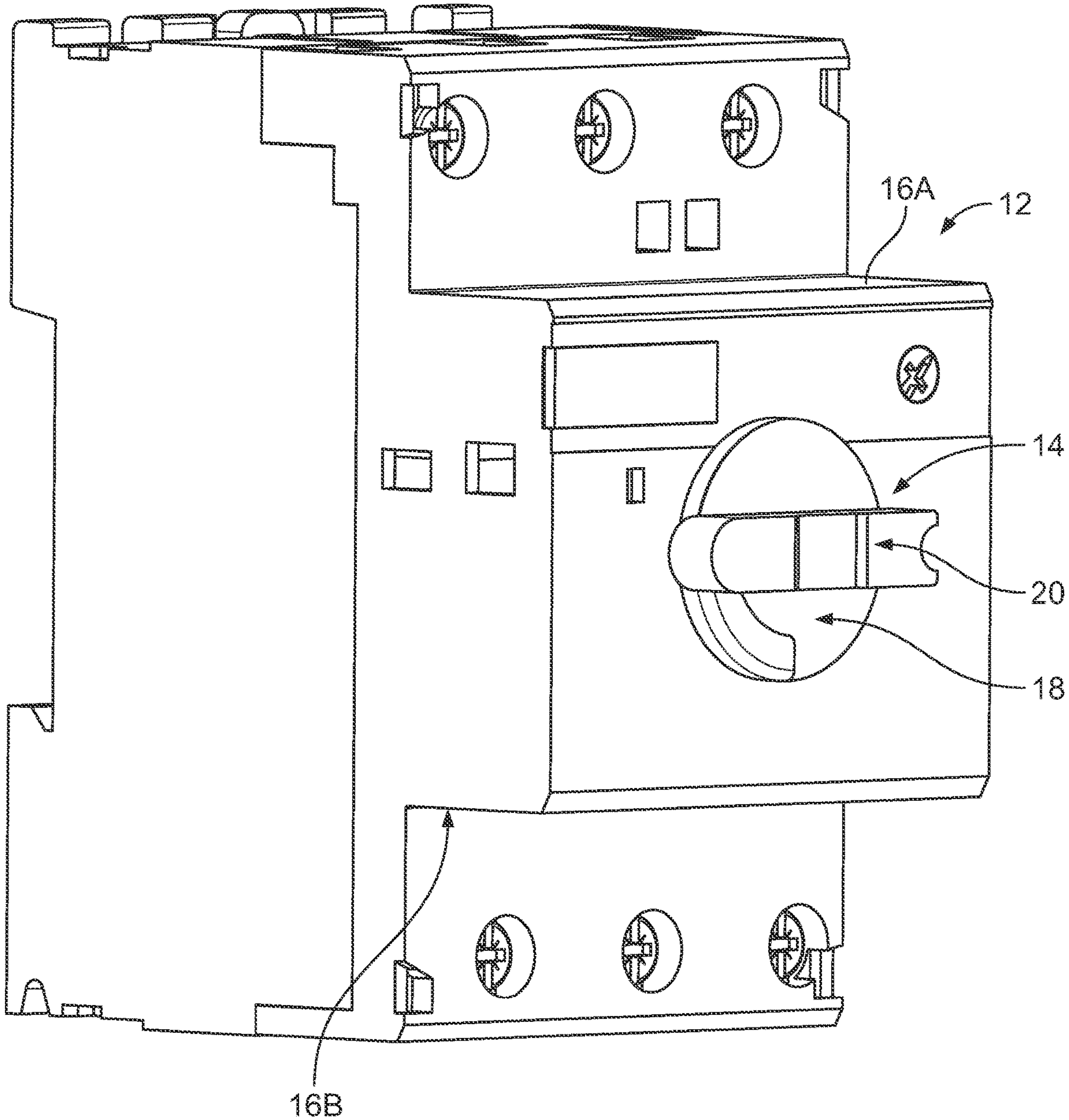
FIG. 1A illustrates the exemplary rotary circuit breaker of FIG. 1 without the rotary circuit breaker lockout device.

FIG. 1 illustrates a lockout device 100 according to an embodiment of the disclosure attached and engaged with a circuit breaker 12, as shown in FIG. 1A, oriented in an open or disengaged position (e.g., not fully locking out a circuit breaker). The lockout device 100 can be coupled to the circuit breaker 12 by engaging one or more portions of the circuit breaker. In particular, the lockout device 100 engages a switch (e.g., a rotary switch) 14 and/or a body 16 of the circuit breaker 12 to prevent the switch 14 from rotating relative to the body 16 to close the circuit breaker 12. The switch 14 may be provided in the form of a knob 18 and a handle 20 extending outwardly from the knob 18. A user may rotate the knob 18 via the handle 20 between an "on" and an "off" position (e.g., rotate the knob 18 a quarter turn), such that current can flow through the circuit breaker when the knob 18 is in an "on" position.

Figure 11:
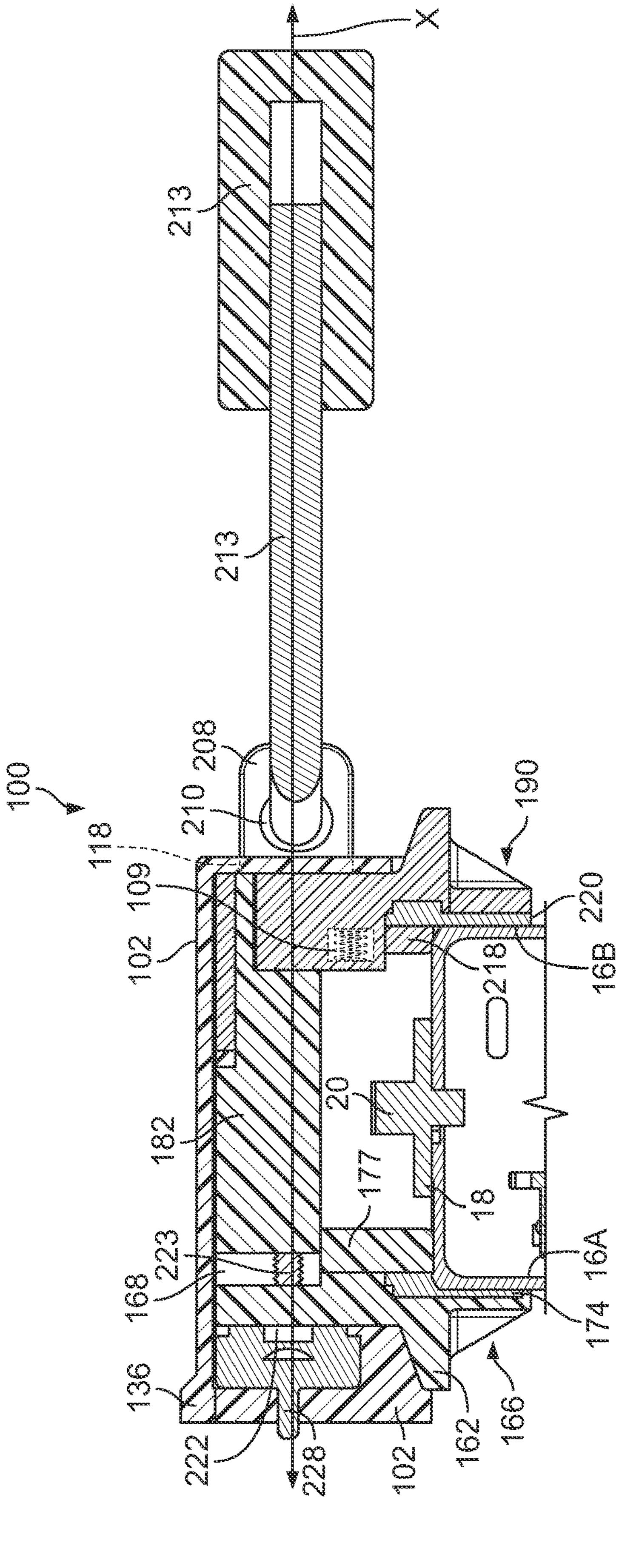
FIG. 11 is a cross-sectional view of the rotary circuit breaker lockout device of FIG. 1, taken along line A-A of FIG. 7, in an engaged configuration and further including the lock of FIG. 2A.

Once the lockout device 100 is coupled to the switch 14 and/or the body 16 of the circuit breaker 12, a portion of the lockout device 100 can be transitioned (e.g., axially (e.g., along axis X as shown in FIG. 11)) from a disengaged position (as illustrated in FIG. 1) to an engaged position (as illustrated in FIG. 11) where it can be locked into position using various types of locking devices. With the circuit breaker switch 14 locked into place and the lockout device 100 in the engaged position, equipment (not shown) on a corresponding circuit can be serviced or repaired.

Although the lockout device 100, shown in FIG. 1, is coupled to an upright circuit breaker 12, it should be understood that this lockout device 100 can be adapted to be coupled to horizontally-oriented circuit breakers, and would only need to be rotated to do so.

FIGS. 2, 2A-2D, and 3-10 depict the rotary circuit breaker lockout device 100 provided in the form of an outer housing 102, an inner housing 104 designed to be positioned within the outer housing 102, and a fastener 106 (e.g., a locking or fastening mechanism, or a screw with an optional thumbwheel). The fastener 106 is designed to couple the outer housing 102 and the inner housing 104 to one another. The fastener 106 and a biasing element 109 (shown in FIGS. 1, 11, and 26 and discussed further hereinbelow), which may be interposed between the outer housing 102 and the inner housing 104, are designed to urge the outer housing 102 to translate axially between the disengaged position and the engaged position (e.g., locked and shown in FIG. 11).

Figure 12:
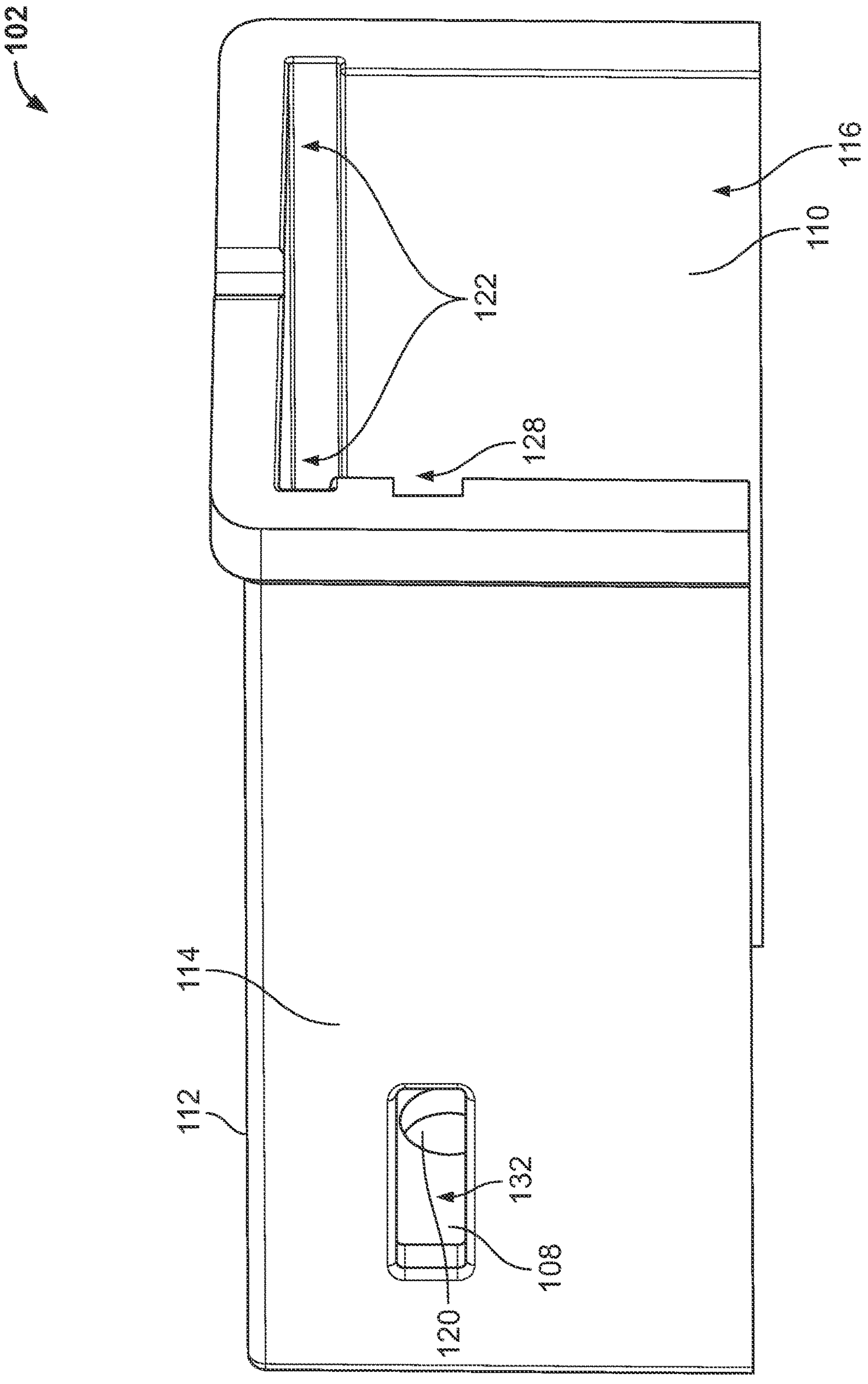
FIG. 12 is a top, left side isometric view of the outer housing of the rotary circuit breaker lockout device of FIG. 1.
Figure 13:
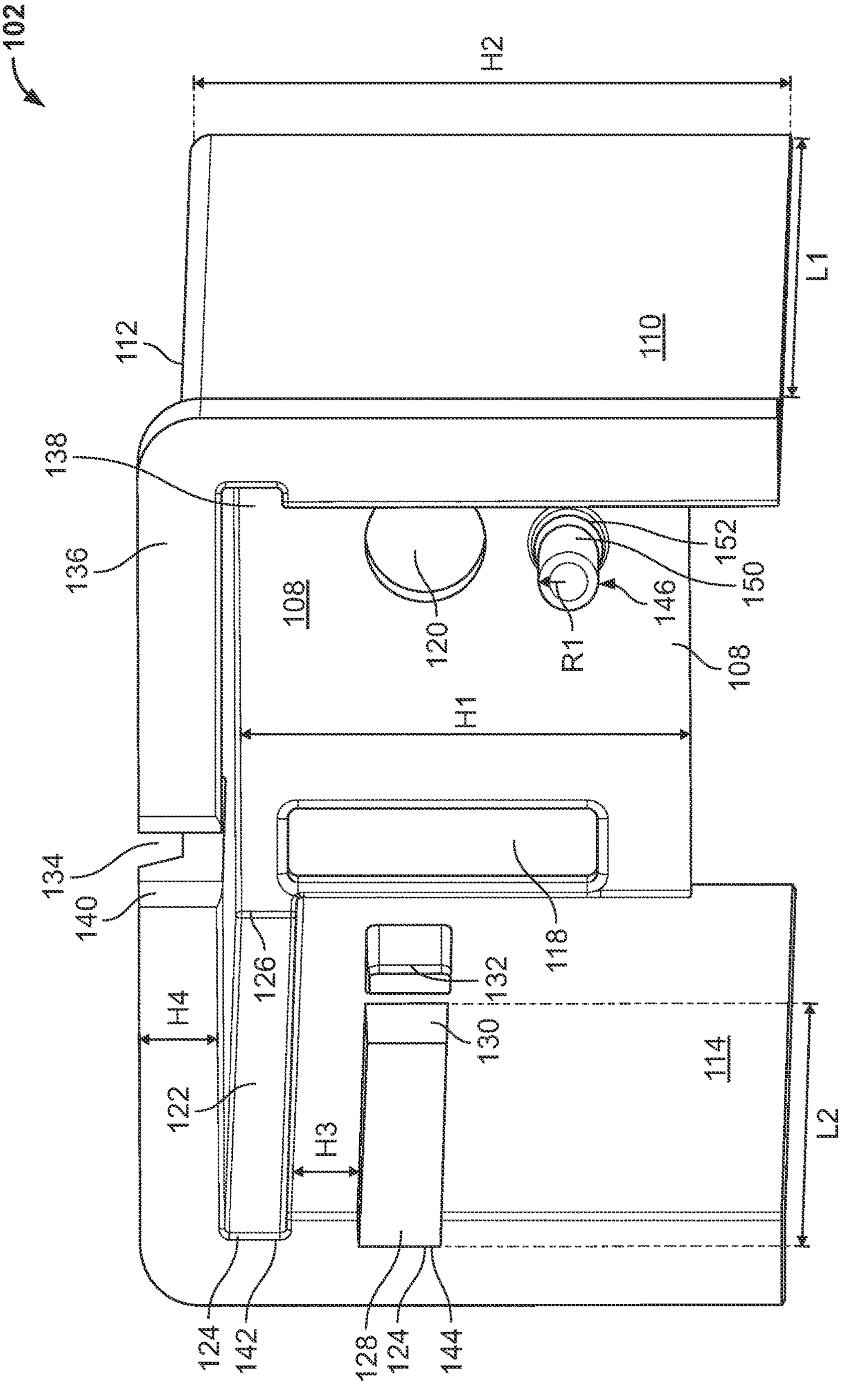
FIG. 13 is a top, right side isometric view of the outer housing of the rotary circuit breaker lockout device of FIG. 1.
Figure 14:
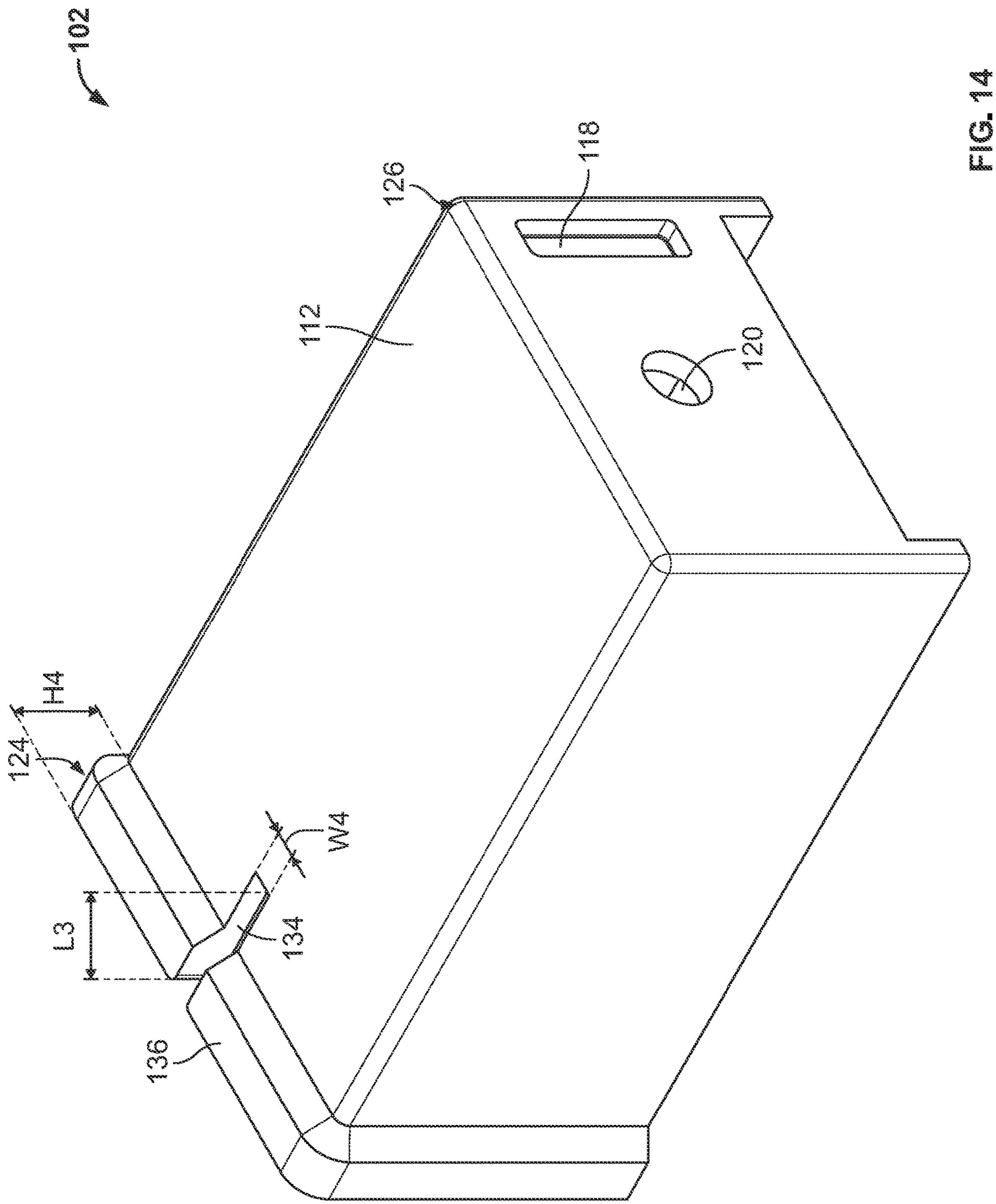
FIG. 14 is a bottom, right side isometric view of the outer housing of the rotary circuit breaker lockout device of FIG. 1.

FIGS. 12-14 depict the outer housing 102 of the lockout device 100. The outer housing 102 has a base wall 108 formed on one axial end of the outer housing 102. A first side wall 110, a second side wall or top wall 112, and a third side wall 114 extend outwardly from the base wall 108 to define a cavity 116 within the outer housing 102. The cavity 116 is designed to receive the inner housing 104 (discussed further hereinbelow). As shown in FIGS. 13 and 14, the base wall 108 is imparted with a cross-sectional rectangular shape. Alternatively, the base wall 108 may have any shape. Further, in one embodiment, shown in FIG. 13, the base wall 108 may have a height dimension H1 that is less than a height dimension H2 of the first side wall 110 and the third side wall 114. The first side wall 110, the second side wall 112, and the third side wall 114 extend substantially perpendicularly away or outward from the base wall 108 to form a three-sided box-like shape with the second side wall 112 extending between the first side wall 110 and the third side wall 114. Additionally, the opposing first side wall 110 and the third side wall 114 are substantially parallel with respect to each other. The outer housing 102 may be formed of a generally rigid material (e.g., acrylonitrile butadiene styrene (ABS)) and/or a molded composite material (e.g., fiberglass reinforced nylon) to prevent breakage or deformation of the outer housing 102 during use.

Continuing with FIGS. 12-14, one or more channels (e.g., guides or bearing surfaces) can be formed within the outer housing 104 to allow and constrain relative motion between the outer housing 104 and the inner housing 102. In some embodiments, a rectilinear channel 118 (as shown in FIGS. 13 and 14) is formed and extends entirely through the base wall 108. The channel 118 may receive a portion of the inner housing 102 (e.g., a tab 208, shown in FIGS. 1, 19, and 20) to allow the outer housing 104 to move axially relative to the inner housing 102, between the disengaged and engaged positions. In some embodiments, the channel 118 is offset to one side of the base wall 108 and has a rectangular shape. Also, in some embodiments, a cylindrical opening 120 is formed and extends entirely through the base wall 108 and may be sized to receive a portion of the fastener 106 to further facilitate moving the outer housing 102 relative to the inner housing 104 and further securing the inner housing 104 and the outer housing 102 together. The opening 120 is positioned centrally with respect to the base wall 108.

Figure 15:
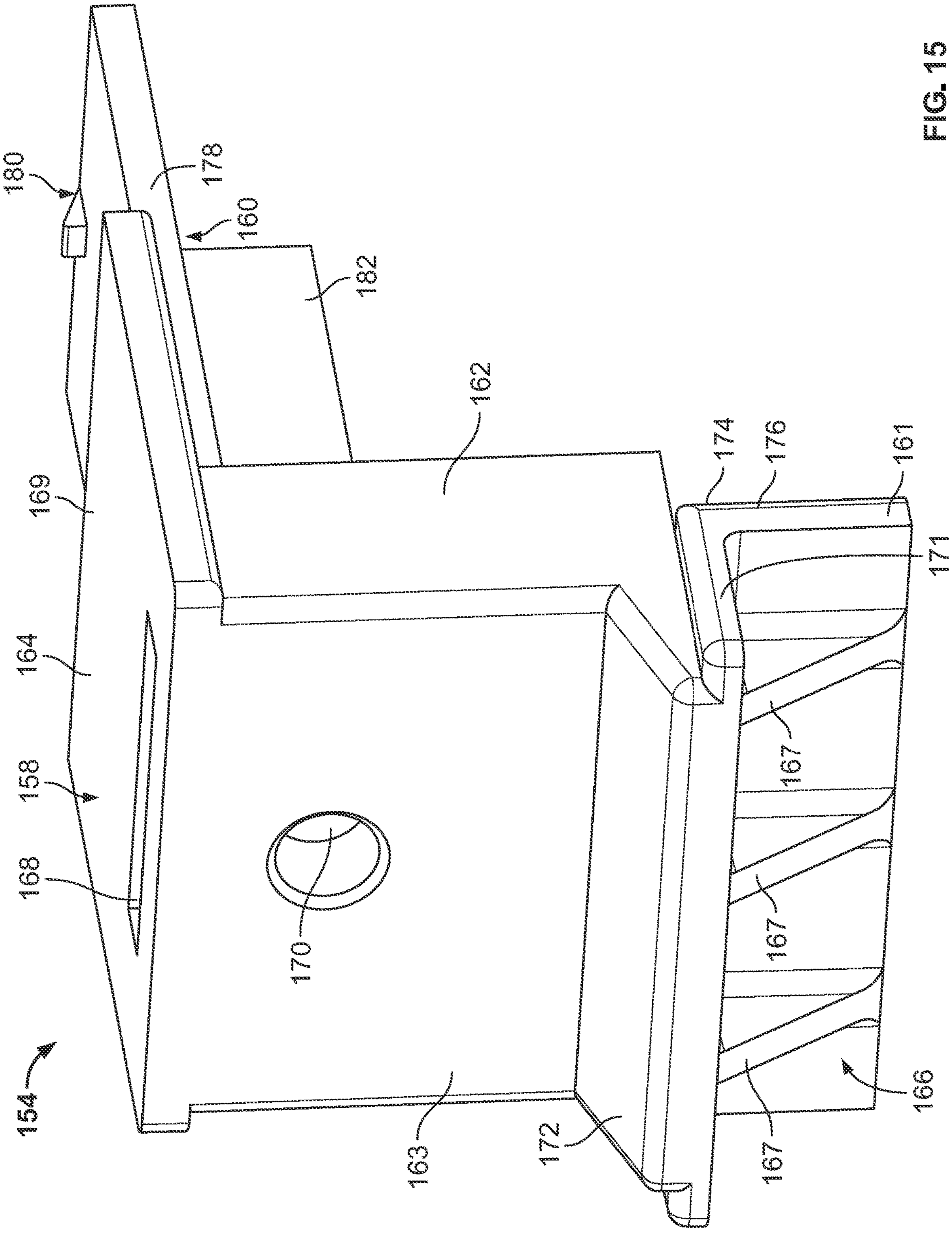
FIG. 15 is a top, right isometric view of a first component of the inner housing of the rotary circuit breaker lockout device of FIG. 1.

Additionally, one or more slots 122 may be formed in the first side wall 110 and the third side wall 114 to (e.g., axially) guide the inner housing 104 within the outer housing 102 (e.g., to enable a platform 164, as shown in FIG. 15, to translate or slide within the channels 122) when the inner housing 104 and the outer housing 102 are engaged. The channels 122 may be imparted with a U-shaped cross-section that extends (e.g., vertically or axially) away from the base wall 108. In some embodiments, the channels 122 are provided in the form of a pair of channels on the opposing first side wall 110 and the third side wall 114 of the outer housing 102 and may extend the entire axial length L1 of the first side wall 110 and the third side wall 114 before terminating at the base wall 108. In one embodiment, as shown in FIG. 13, the channels 122 extend between a first end 124 of the outer housing 102 and a second end 126 of the outer housing 102, such that the second end 126 is at or near the base wall 108.

Figure 10:
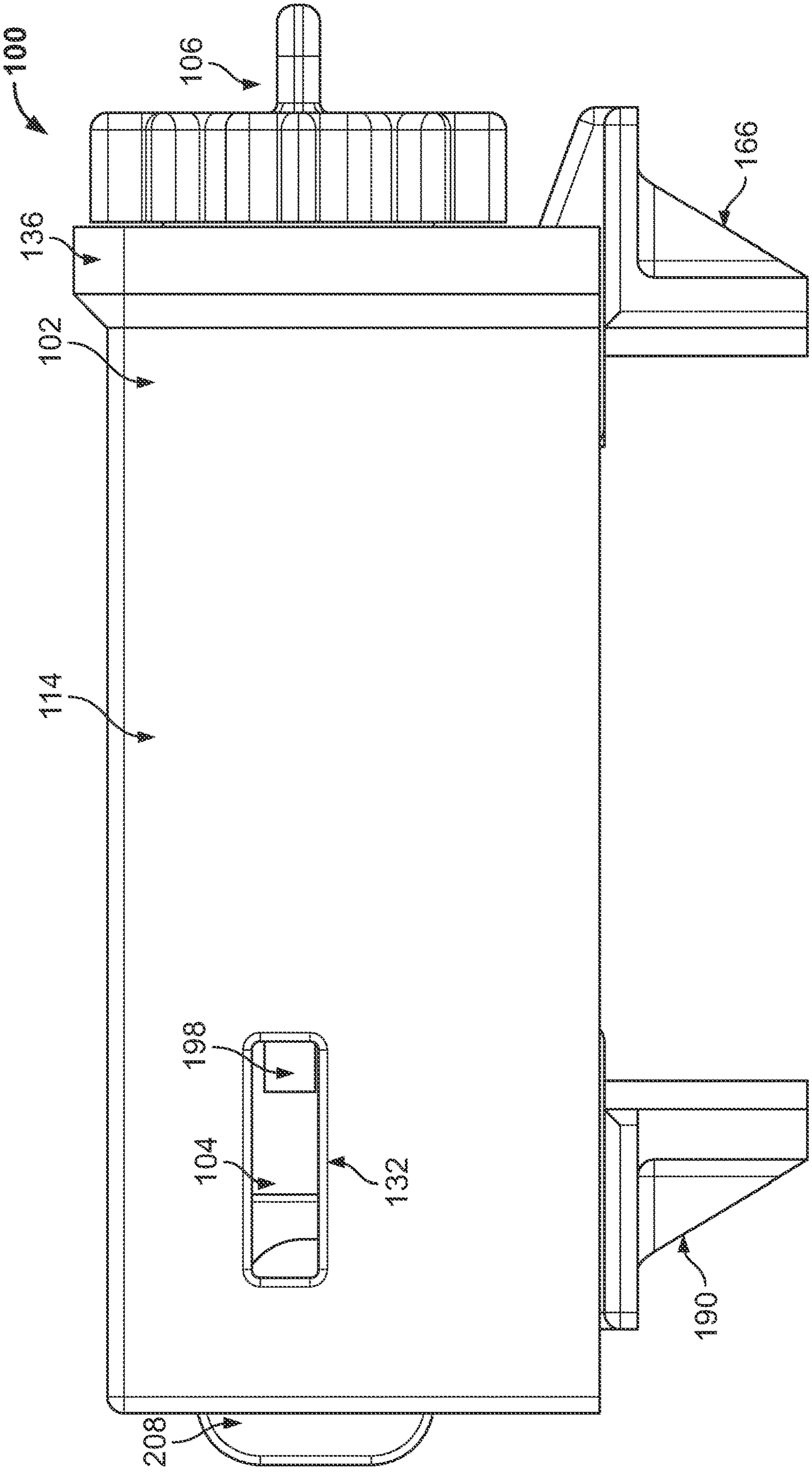
FIG. 10 is a left side plan view of the rotary circuit breaker lockout device of FIG. 1.

Continuing with FIG. 13, another groove 128 may be formed (e.g., axially) in the third side wall 114 to define a pathway and guide the inner housing 104 within the outer housing 102 (e.g., to enable a projection or tab 198, as shown in FIG. 10, to translate or slide within the groove 128). In alternative embodiments, the groove 128 may be formed in one or more of the first side wall 110 and the second side wall 112. As depicted, the groove 128 is imparted with a U-shaped cross-section that extends from the first end 124 of the outer housing 102 and has an axial length L2 that terminates at a second end 130. The axial length L2 is less than the axial length L1 of the first of the channels 122. The groove 128 is spaced at a height (e.g., distance) dimension H3 from the channel 122.

Additionally, a window 132 may be formed in at least one of the first side wall 110. the second side wall 112, and the third side wall 114. As shown in FIG. 13, the window 132 is formed in and extends entirely through the third side wall 114. More specifically, the window 132 may be positioned in axial alignment with the groove 128 and may be positioned between the groove 128 and the base wall 108. Further, the window 132 may have an outer perimeter with a substantially rectangular shape to constrain axial movement between the inner housing 104 and the outer housing 102, as discussed in further detail hereinbelow, and to prevent the inner housing 104 from being ejected from the outer housing 102 during use.

As best seen in FIG. 14, the top wall 112 has a slot 134 formed therein that is imparted with a rectilinear shape and is designed to extend (e.g., axially) outward from the first end 124 of the outer housing 102 a length dimension L3 toward the base wall 108. In one embodiment, the length dimension L3 is less than the axial length L2 of the groove 128 and further is less than the axial length L1 of the side wall 110. The slot 134 further has a width dimension W4. In one embodiment, the length dimension L3 is greater than the width dimension W4. In a further embodiment, the length dimension L3 is at least two times greater than the width dimension W4. The slot 134 is designed to receive a portion of the fastener 106 to facilitate holding the fastener 106 and/or the lockout device 100 in a secured and/or engaged position.

As shown in FIGS. 12-14, the outer housing 102 has an optional collar 136 circumscribing and extending outwardly from and along the first side wall 110, the second side wall 112, and the third side wall 114 at or near the first end 124 of the outer housing 102 to create a lip and provide additional strength to the outer housing 102. The collar 136 may be coupled to the outer housing 102 or may be integrally formed with the outer housing 102 and flares outwardly beyond the cross-sectional footprint of the outer housing 102. The collar 136 may have a height dimension H4, discussed further herein. Further, the collar 136 may have a plurality of notches formed therein that are coextensive with the first side wall 110, the second side wall 112, and/or the third side wall 114. A rectilinear first notch 138 is formed within the collar 136, is coextensive with the first side wall 110, and aligns with the channel 122 of the first side wall 110. A second notch 140 may have a V-shape or a rectilinear shape and is formed within the collar 136, is coextensive with the second side wall, and aligns with the slot 134 of the second side wall 112. A rectilinear third notch 142 is formed within the collar 136, is coextensive with the third side wall 114, and aligns with the channel 122 of the third side wall 114. A fourth rectilinear notch 144 is formed within the collar 136, is coextensive with the third side wall 114, and aligns with the groove 128 of the third side wall 114. The plurality of notches 138, 140, 142, and 144 facilitate alignment and engagement of the inner housing 104 and the outer housing 102.

Figure 26:
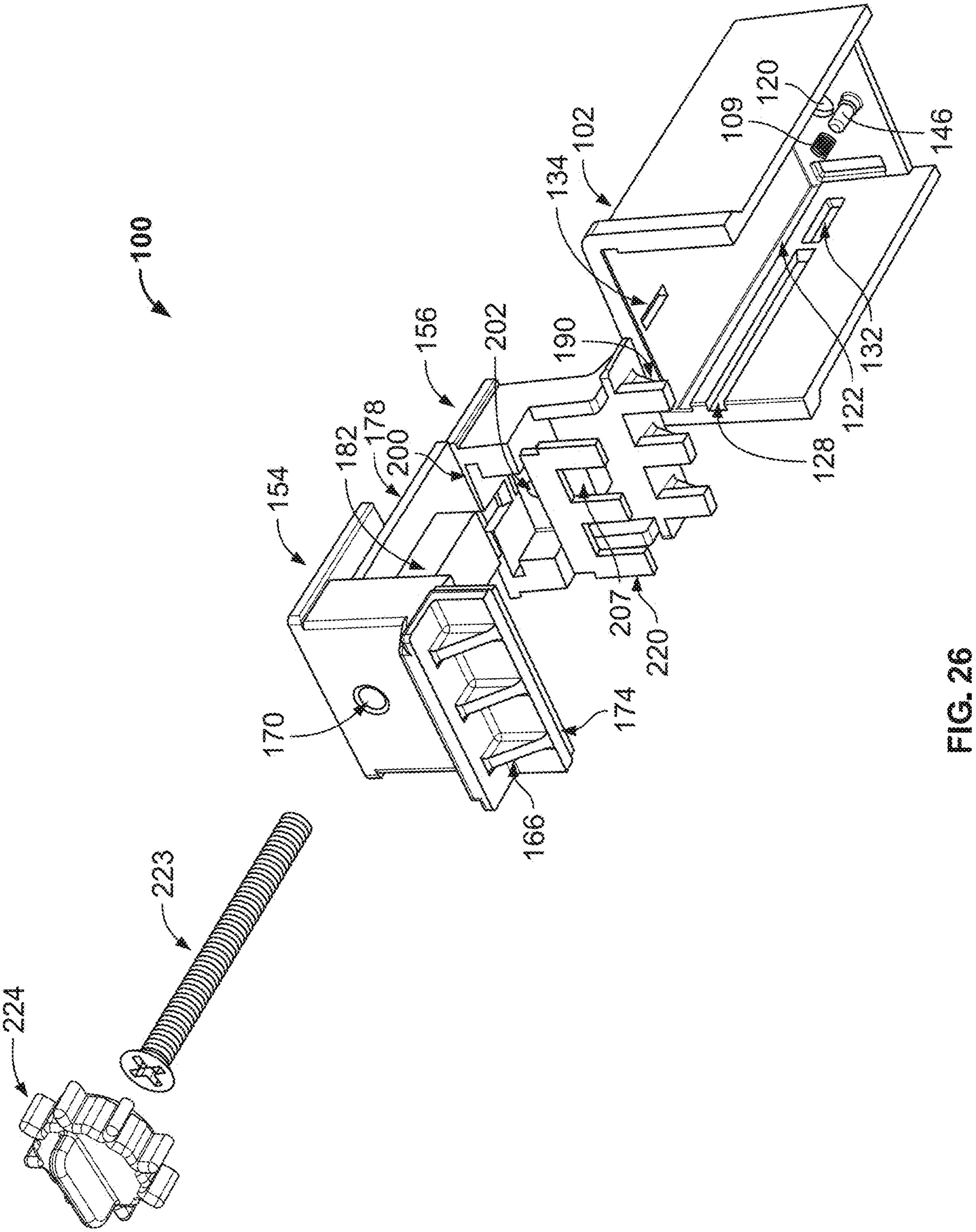
FIG. 26 is an exploded, right view of the rotary circuit breaker lockout device of FIG. 1.

In addition, the outer housing 102 may include a support structure provided in the form of a post 146 that protrudes outwardly (e.g., axially and/or upwardly) away from the base wall 108 to engage with and/or support the biasing element 109 (shown in FIGS. 11 and 26).

The biasing element 109 can be provided in the form of a compression spring or a resilient member (e.g., formed of elastomeric material). The biasing element 109 is designed to be interposed between the inner housing 104 and the outer housing 102. More specifically, the biasing element 109 can be received within the outer housing 102 to bias (e.g., guide, urge, and/or translate) the inner housing 104 (e.g., axially) and/or the outer housing 102 between the disengaged position (shown in FIG. 1) and the engaged position (shown in FIG. 11).

Still referring to FIGS. 12-14, the support structure 146 of the outer housing 102 may be integrally formed with the base wall 108 and extends substantially perpendicularly away from the base wall 108. In some embodiments, the support structure 146 has a substantially cylindrical shape to extend through and hold and/or support the biasing element 109 (e.g., a central channel of a compression spring). The support structure 146 can be formed of a first section 150 nearest the base wall 108 and a second section 152 extending outward and away from the first section 150. In some embodiments, the first section 150 has a first radius R1, and the second section 152 has a second radius (not labeled), wherein the radius R1 may be smaller than the second radius of the second section 152. The first section 150 can closely match or form an interference fit with the biasing element 109 to anchor the biasing element 109 to the outer housing 102, while the second section 152 can guide the motion and/or direction of the biasing element 109. As shown in FIG. 13, the opening 120 within the base wall 108 may be (e.g., vertically) aligned with the support structure 146. Alternatively, the opening 120 and the support structure 146 may be offset on the base wall 108.

Turning to FIGS. 15-22, the inner housing 104 is depicted. The inner housing 104 may be provided in the form of a first jaw or first component 154 and a second jaw or second component 156 collectively designed to work in conjunction with one another. The first component 154 and the second component 156 define a switch receiving recess 157 to receive at least a portion of a circuit breaker rotary switch 14 and/or the circuit breaker body 16. Additionally, the first component 154 and the second component 156 are designed to slide or move within the cavity 116 of the outer housing 102 along the channels 122 and/or the groove 128 between the disengaged position (shown in FIG. 1) and the engaged position (shown in FIG. 11). In the disengaged position, the first component 154 and/or the second component 156 are designed to be disposed in a first, separated or disengaged configuration from the second component 156, whereby the rotary switch 14 is not locked in place and not positioned within the recess 157. In the engaged position, the first component 154 and/or the second component 156 are designed to be disposed in a second, engaged position whereby the rotary switch 14 is positioned within the recess 157 and is engaged by the first component 154 and/or the second component 156.

The inner housing 104 may be formed of a polymeric or composite compound, such as fiberglass reinforced nylon to prevent breakage or deformation of the inner housing 104 during use. As described herein, the inner housing 104 and the outer housing 102 are formed of different material(s); however, in alternative embodiments, the inner housing 104 and the outer housing 102 are formed of the same material(s).

Figure 16:
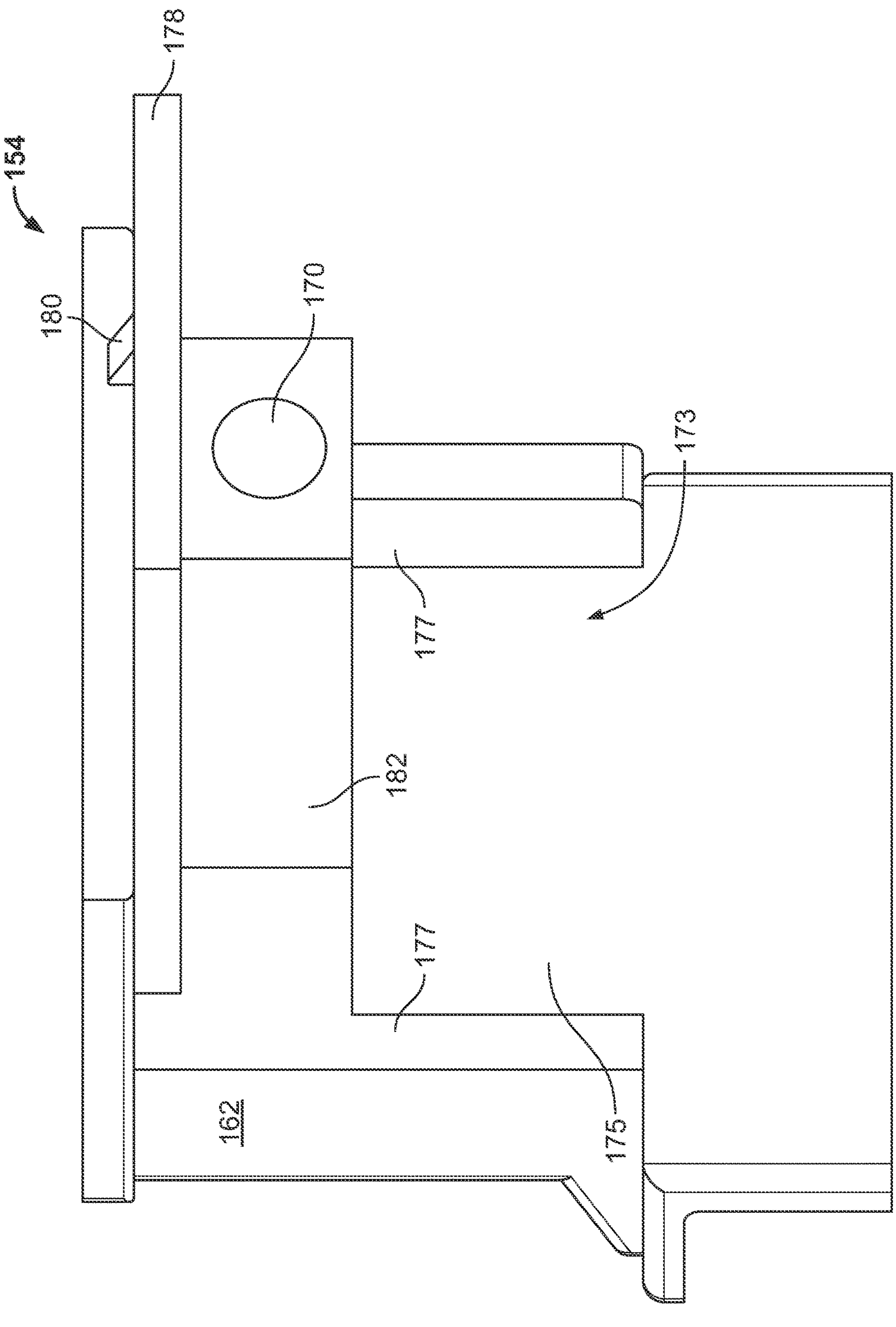
FIG. 16 is a bottom, right side isometric view of the first component of the inner housing of FIG. 15.
Figure 17:
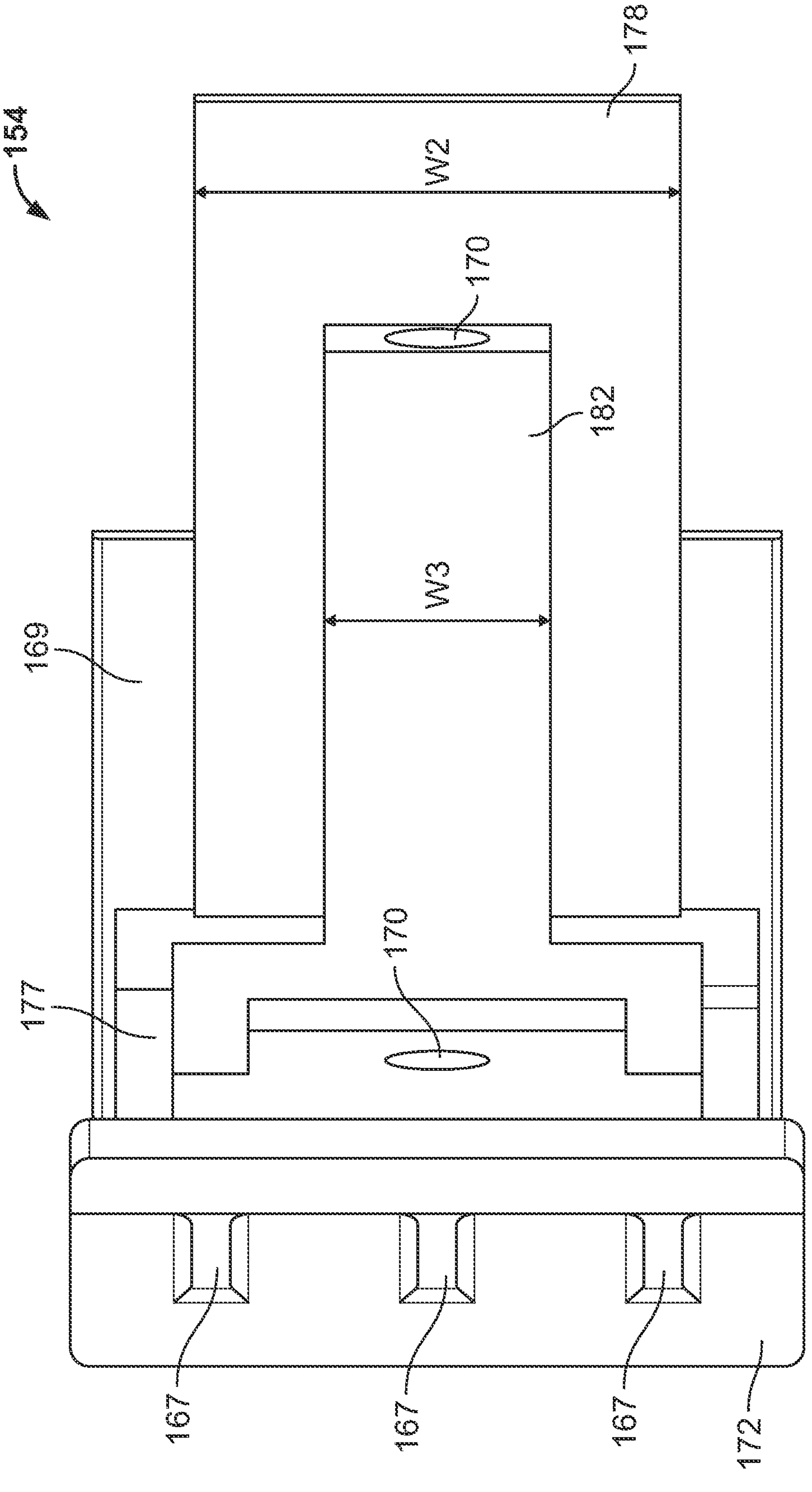
FIG. 17 is a rear isometric view of the first component of the inner housing of FIG. 15.

FIGS. 15-17 depict the first component 154 designed to slide within at least a portion of the outer housing 102. The first component 154 is provided in the form of an engaging section or L-shaped body section 158 that may engage at least a portion of the circuit breaker body 16. In addition to the body section 158, the first component 154 may have a section 160 extending (e.g., axially) outward from the body section 158. The section 160 is designed to engage at least a portion of the second component 156 and/or a portion of the circuit breaker body 16.

Figure 7:
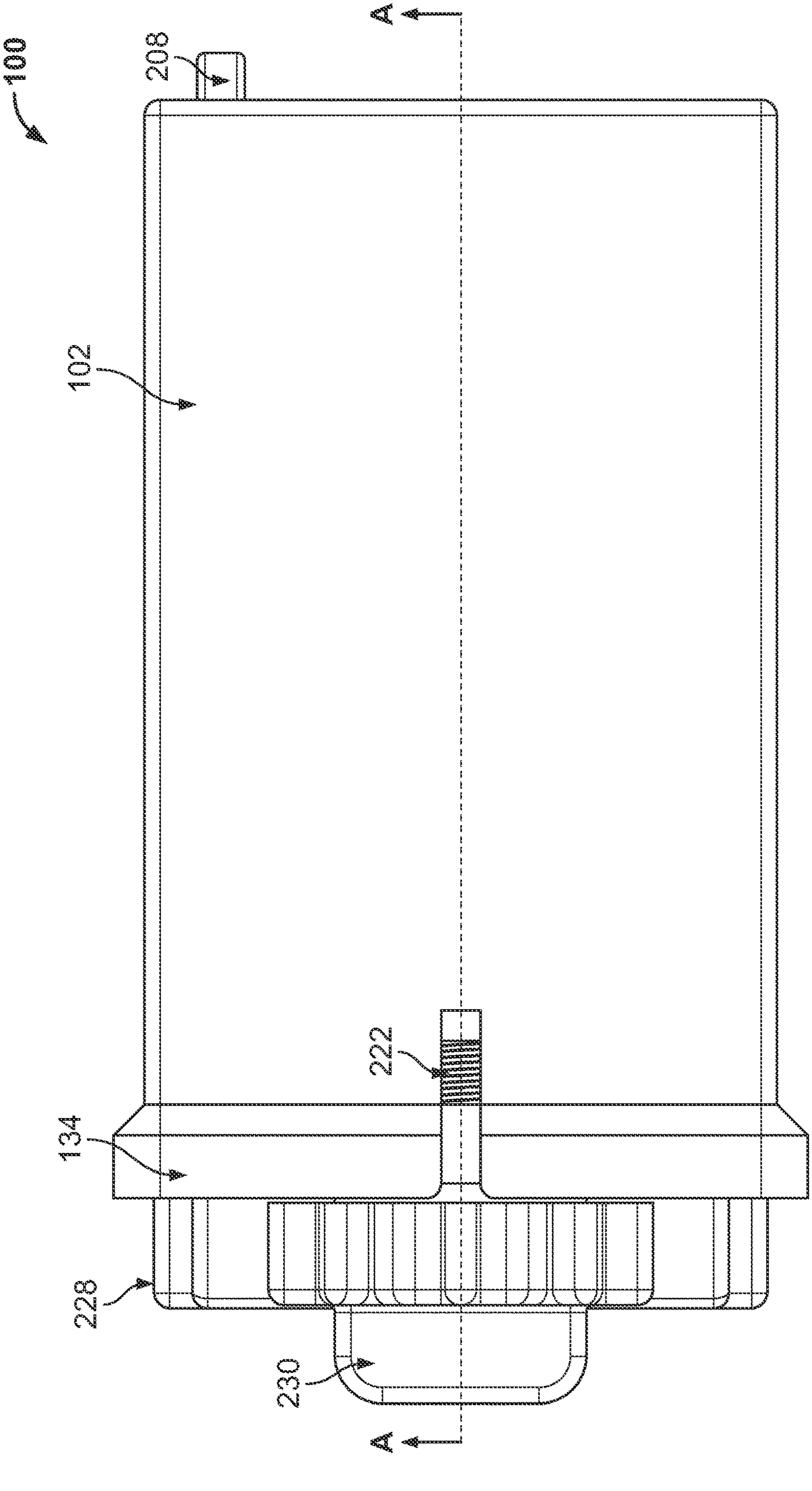
FIG. 7 is a front plan view of the rotary circuit breaker lockout device of FIG. 1.
Figure 8:
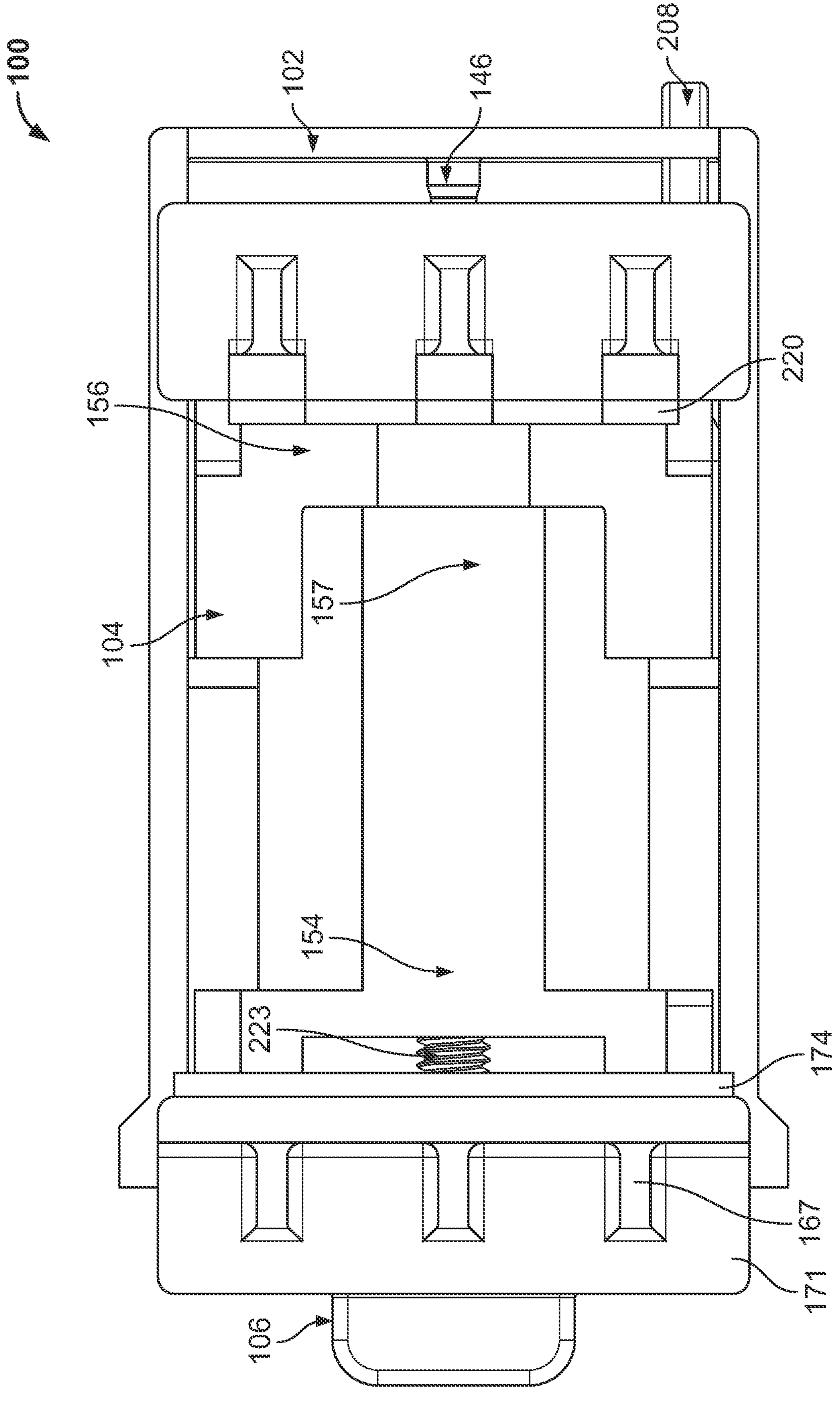
FIG. 8 is a rear plan view of the rotary circuit breaker lockout device of FIG. 1.
Figure 9:
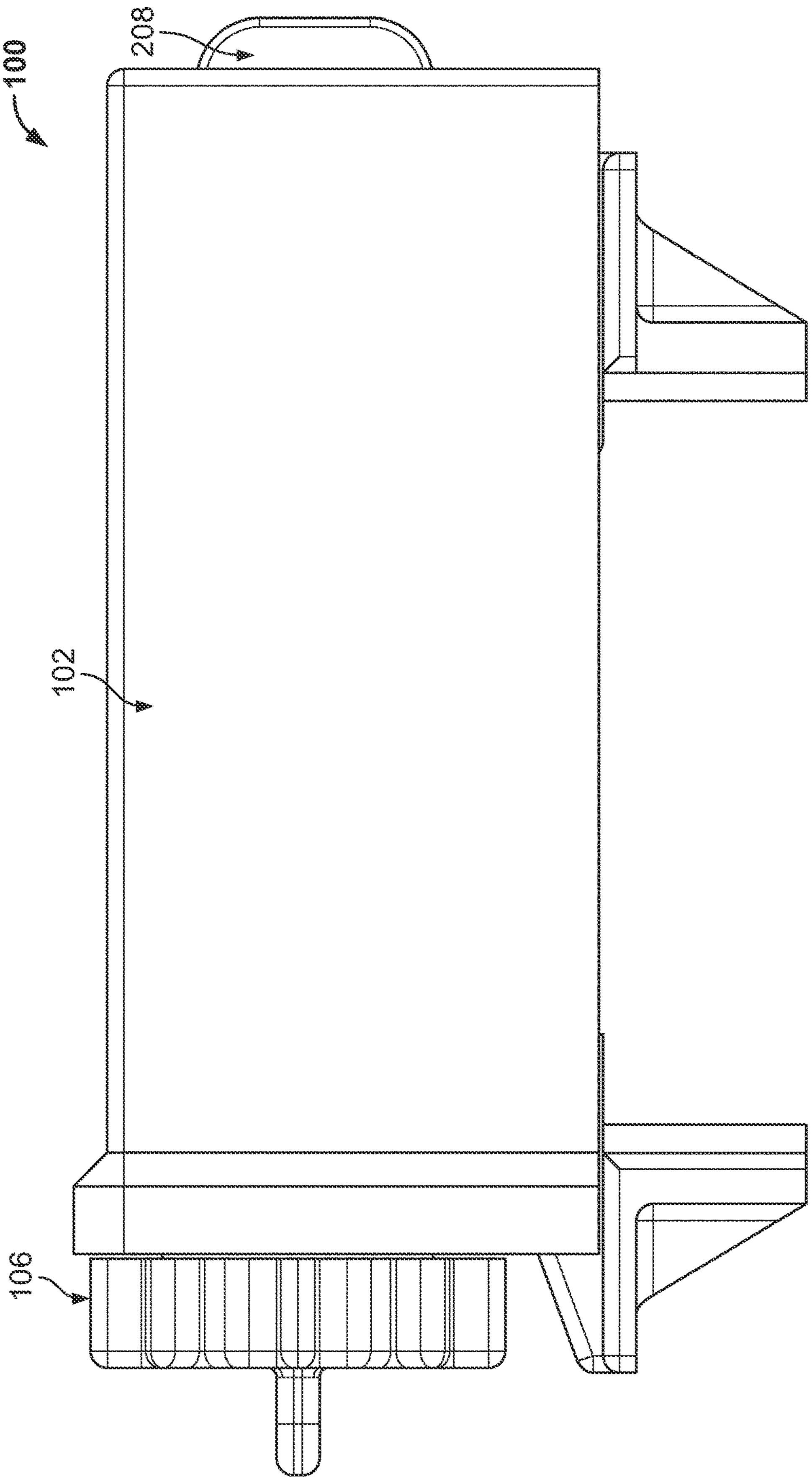
FIG. 9 is a right side plan view of the rotary circuit breaker lockout device of FIG. 1.

The body section 158 is provided in the form of a body 162 having a substantially rectangular shape extending between an upper platform 164 and a first engagement component 166. The upper platform 164 is designed to be received in the channels 122 of the outer housing 102 and has a surface 169 that may abut and/or contact at least a portion of the side wall 112, and further may include a rectilinear window 168 that extends entirely through the body 162. The window 168 may have a substantially rectangular shape and provide a view of the fastener 106 when in use (as shown in FIG. 7). Additionally, the body 162 has a cylindrical opening 170 (e.g., extending axially through the body 162) designed to receive at least a portion of the fastener 106 therein. The body 162 further has an angled surface 172 that extends tangentially away from the body 162 and is designed to prevent interference with the fastener 106. In one embodiment, shown in FIG. 16, an indentation 173 may be formed at or near a rear surface 175 of the body 162 such that the indentation 173 may be designed to form part of the recess 157 and the indentation 173 may be formed between an optional pair of arms 177, such that at least a portion of the rotary switch 14 may be received therein.

Turning to the first engagement component 166 extending from the body 162, the first engagement component 166 is shaped to enable the lockout device 100 to securely fit and/or engage the rotary circuit breaker 12. The first engagement component 166 is provided in the form of at least one surface 171 extending (e.g., horizontally) outwardly from the body 162 and at least one gripping projection (e.g., a first gripping projection) 161 extending (e.g., vertically and/or downwardly) from the body 162 and extending substantially perpendicularly to the surface 171 (see FIG. 15). The first engagement component 166 and/or the at least one gripping projection 161 is designed to couple to (e.g., grip) a first surface 16A (see FIG. 1) of the circuit breaker body 16. In one embodiment, each gripping projection 161 is provided in the form of a rectangular flange. Moreover, as shown in FIG. 15, each gripping projection 161 may have at least one optional support element 167 and a grip surface 176 opposite the support element 167. In another embodiment, the first engagement component 166 may be a plurality of gripping projections (e.g., three gripping projections or a first set of gripping projections) 161 with a space or a void extending between each gripping projection (not shown). The first engagement component 166 enables the device 100 to fit on a wide variety of circuit breakers. In further embodiments, the first engagement component 166 may have any number of projections 161 designed to engage at least a portion of the circuit breaker housing 16 and/or the circuit breaker switch 14. Also in further embodiments, the first engagement component 166 and/or projections 161 may be provided in the form of a different size and/or a different shape.

Figure 16A:
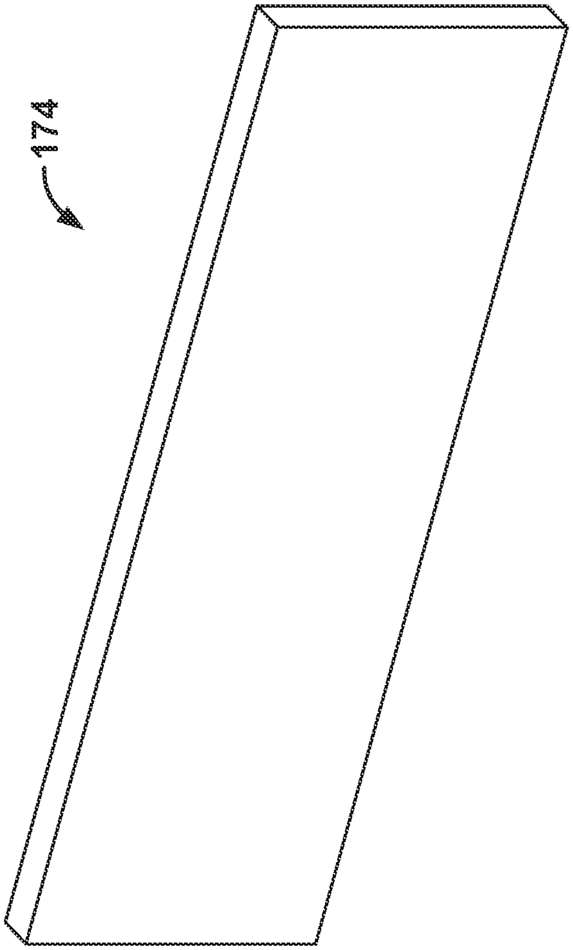
FIG. 16A is an isometric view of a plate for use with the first component of the inner housing of the rotary circuit breaker lockout device of FIG. 1.

As shown in FIGS. 15 and 16A, an optional plate 174 (e.g., a first plate) may couple to the grip surface 176 of the gripping projection 161 and/or the first engagement component 166 to increase the gripping capability of the first component 154 to at least a portion of the circuit breaker 12. The plate 174 may be provided in the form of a rectangular shape to correspond in shape and size with the projection 161 of the first engagement component 166. The plate 174 may be provided in the form of at least one of a metal material, rubber, grip tape, sandpaper, or another material that facilitates the holding force, and/or any combination thereof.

Continuing with FIG. 15, the lateral section 160 of the first component 154 may have an upper platform 178 extending (e.g., axially) outward from the body 162 and may abut a portion of the upper platform 164. The upper platform 178 may have an optional projection 180 designed to engage at least a portion of the second component 156 (as discussed further herein). The optional projection 180 may have a substantially triangular shape and may be stationary or may be designed to be moved between an erect position (as shown in FIG. 15) or a depressed position (not shown). The section 160 further may have a lower platform 182. In one embodiment, the opening 170 extends (e.g., axially) from body 162 and continues such that the opening 170 also extends entirely through the platform 182, such that the opening 170 is sized to receive the fastener 106 therein.

Figure 18:
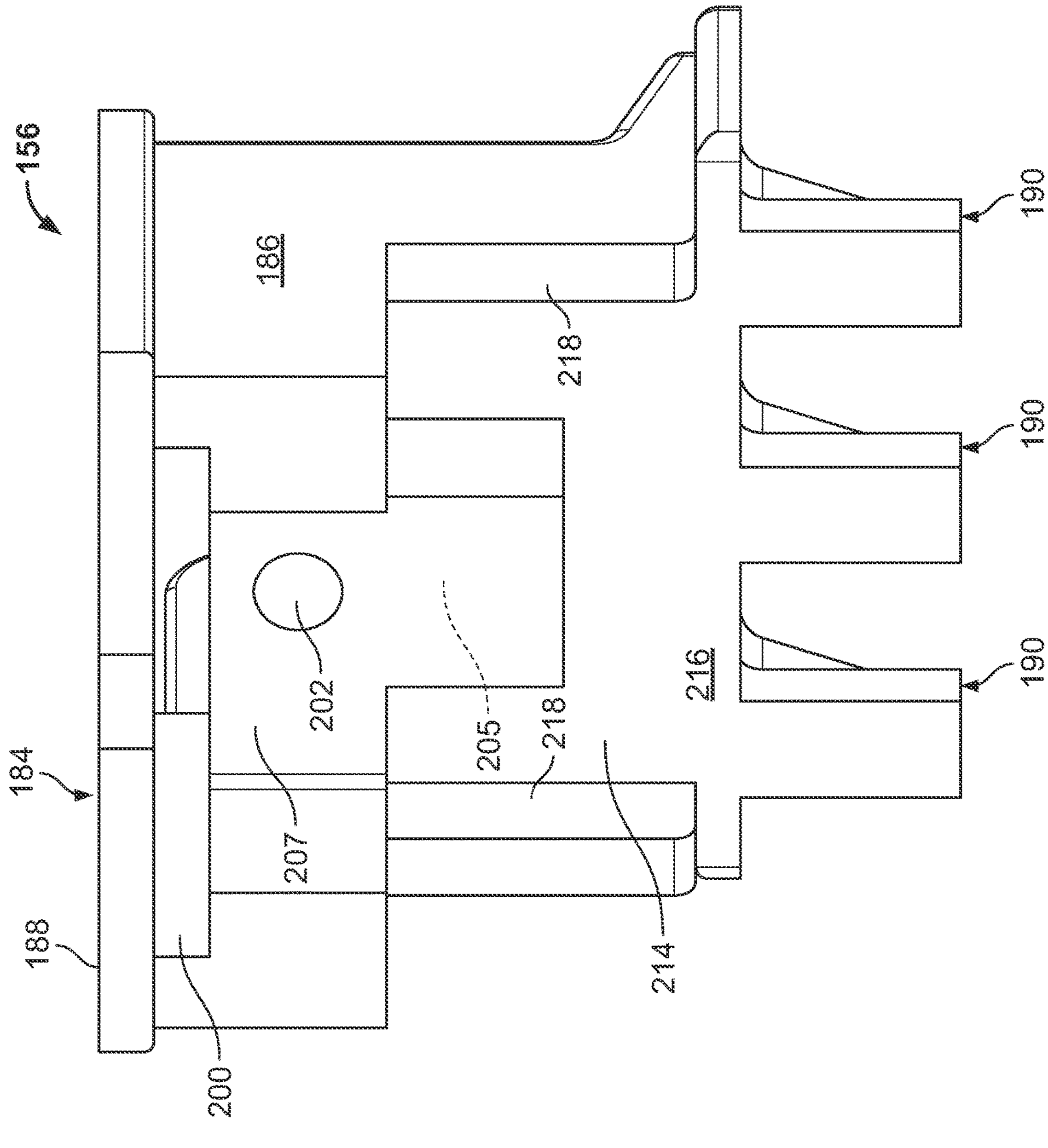
FIG. 18 is a top, right isometric view of a second component of the inner housing of the rotary circuit breaker lockout device of FIG. 1.
Figure 19:
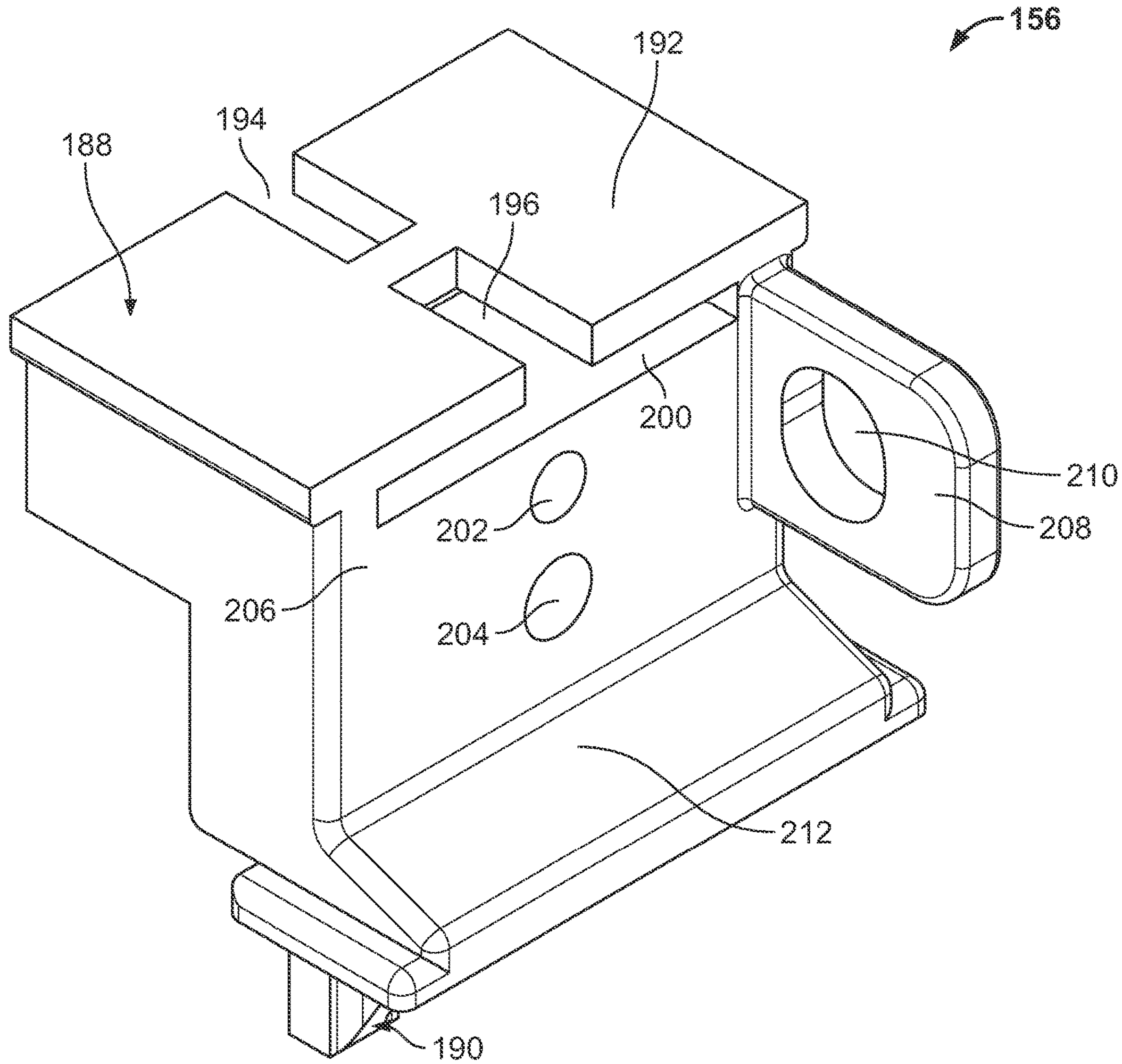
FIG. 19 is a bottom, right isometric view of a second component of the inner housing of the rotary circuit breaker lockout device of FIG. 18.
Figure 20:
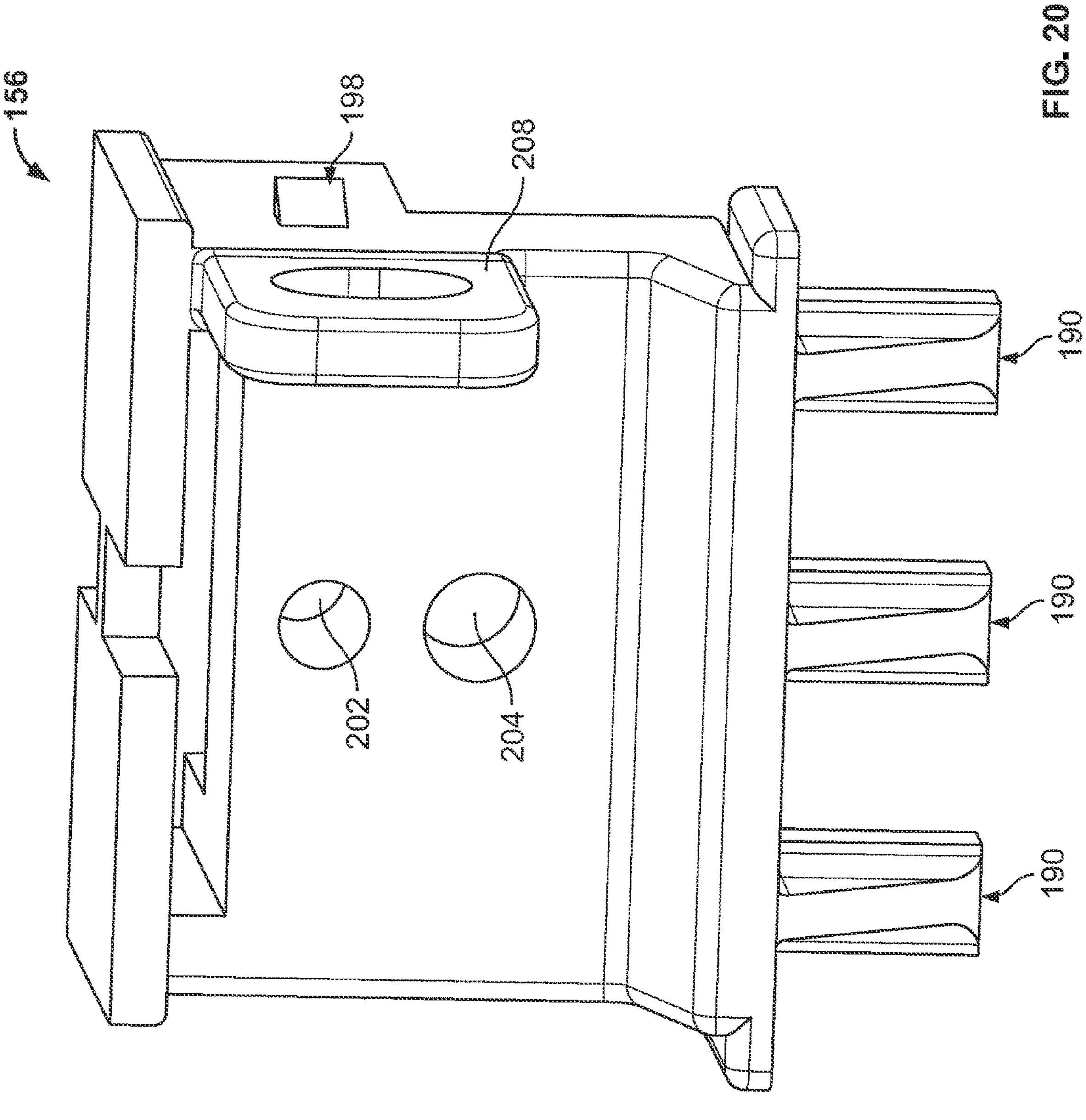
FIG. 20 is a bottom, left isometric view of the second component of the inner housing of the rotary circuit breaker lockout device of FIG. 18.

Turning to FIGS. 18-20, the second component 156 of the inner housing 104 is depicted. The second component 156 is designed to mate with the first component 154 to form the recess 157 such that at least a portion of the rotary switch 14 is inserted therein. The second component 156 has a body section 184 designed to engage at least a portion of the outer housing 102 and at least a portion of the rotary switch 14 therein.

Similar to the first component 154, the body section 184 is provided in the form of a body 186 having a substantially rectangular shape extending between an upper platform 188 and a second engagement component 190. The top platform 188 is designed to be received in the channels 122 of the outer housing 102 and has an H-shaped surface 192 that may abut and/or contact at least a portion of the side wall 112 when the first component 154 and the second component 156 are mated together. Two opposing rectilinear slots are provided in the form of a first slot 194 and a second corresponding slot 196, which may be axially aligned with the slot 194, forming the H-shape within the platform 188. The slot 194 further may be designed to receive the projection 180 of the first component 154 of the inner housing 104 therein to limit the axial movement of the second component 156 when mated with the first component 154.

Additionally, the second component 156 may include the projection 198 extending outwardly from the body 186 which is designed to engage with the window 168 of the first component 168, such that the projection 198 also further limits the axial movement of the second component 156 when engaged within the window 168 and when mated with the first component 154. The projection 198 is imparted with a substantially triangular shape and may be stationary or may be designed to be moved between an erect position (as shown in FIG. 15) or a depressed position (not shown).

Further, the second component 156 defines a channel 200 (e.g., between the platform 188 and the body 186) designed to receive the platform 178 of the first component 154 of the inner housing 104 within the channel 200. The channel 200 may have a substantially rectangular shape.

Additionally, the body 186 bas a first opening 202 (e.g., extending axially through the body 186) designed to receive at least a portion of the fastener 106 therein, and may be substantially colinear and/or coextensive with the opening 170 of the first component 154 when the first component 154 and the second component 156 are mated together. The body 186 further may include a second opening 204 that is (e.g., vertically) aligned and offset with the opening 202, such that the opening 204 is designed to receive at least a portion of the support structure 146 of the outer housing 102 therein. In one embodiment, as shown in FIGS. 18-20, the opening 204 does not extend entirely through the body 186 but rather extends between an outer surface 206 and terminates at an inner surface 205 of a stopping element 207 to enable the biasing element 109 to be positioned between the inner housing 104 and the outer housing 102.

As depicted in FIGS. 19 and 20, the second component 156, and more particularly the body 186 may include a tab 208 extending outward and away from the surface 206. In one embodiment, the tab 208 may be imparted with rounded edges. The tab 208 may be substantially perpendicular to the surface 206 and may have a lock receiving aperture 210 therethrough. The lock receiving aperture 210 is designed to receive a portion of a lock 213 (e.g., a padlock) therein to lock the lockout device 100 in a closed engaged position to prevent removal of the lockout device 100 and any additional movement of the rotary switch 14.

The body 186 further may have an angled surface 212, similar to the angled surface 172 of the first component 154 of the inner housing 104, such that the angled surface 212 extends tangentially outwardly and away from the body 186.

In one embodiment, shown in FIG. 18, an indentation 214, similar to the indentation 173, may be formed at or near a rear surface 216 of the body 162 such that the indentation 214 may be designed to form part of the recess 157, and the indentation 214 may be formed between an optional pair of arms 218.

As shown in FIG. 18, turning to the second engagement component 190 extending from the body 186, the second engagement component 190 is shaped to enable the lockout device 100 to securely fit and/or engage the rotary circuit breaker 12. The second engagement component 190 enables the device 100 to fit on a wide variety of circuit breakers and is provided in the form of at least one surface 191 extending (e.g., horizontally) outwardly from the body 186 and at least one gripping projection (e.g., a second set of gripping projections) 193 extending (e.g., vertically and/or downwardly) from the body 186 and extending substantially perpendicularly to the surface 191. The second engagement component 190 and/or the at least one gripping projection 193 is designed to couple to (e.g., grip) a second surface 16B (see FIG. 1) of the circuit breaker body 16.

Figure 2:
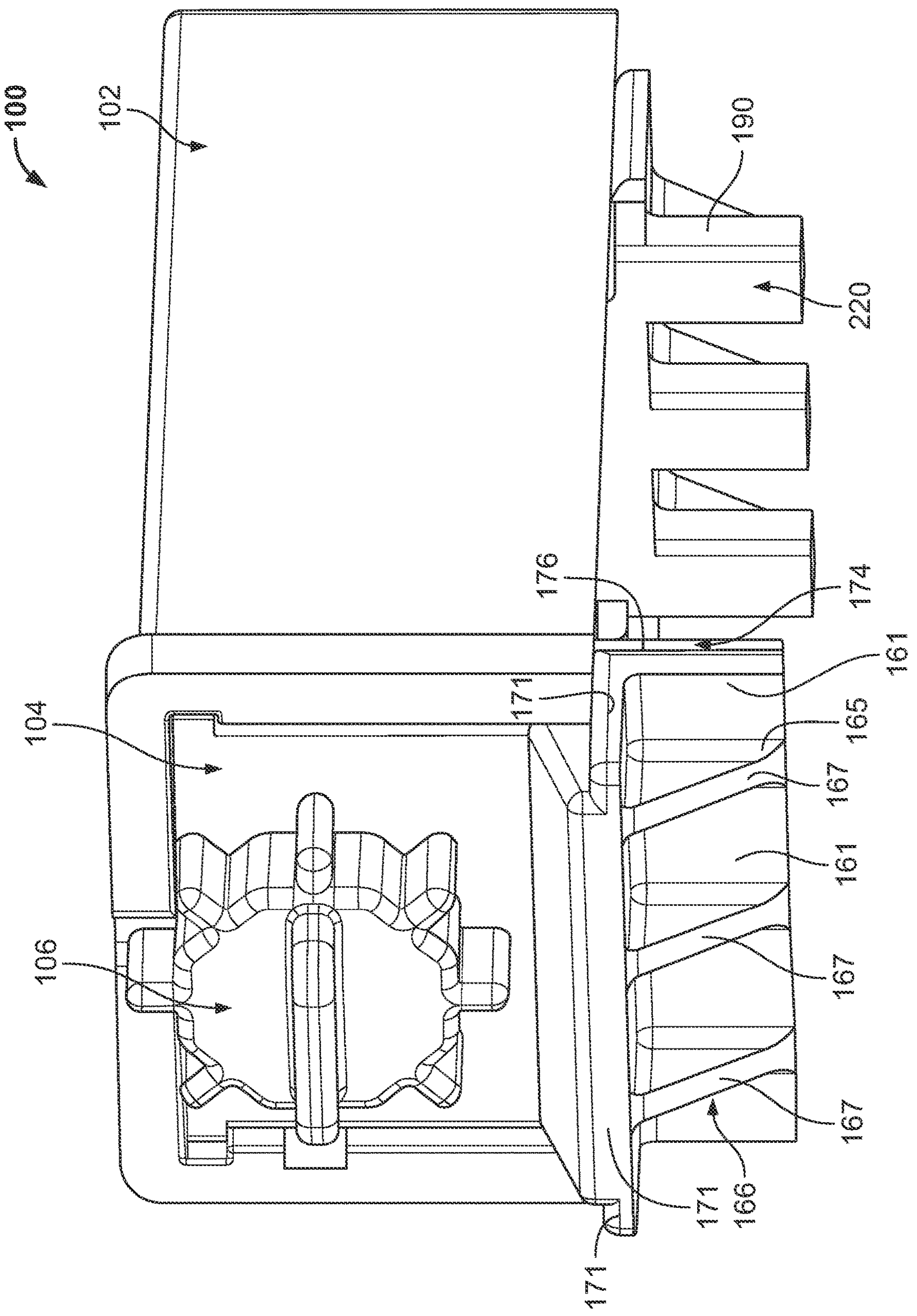
FIG. 2 is a front, right side isometric view of the rotary circuit breaker lockout device of FIG. 1 without a lock.
Figure 2A:
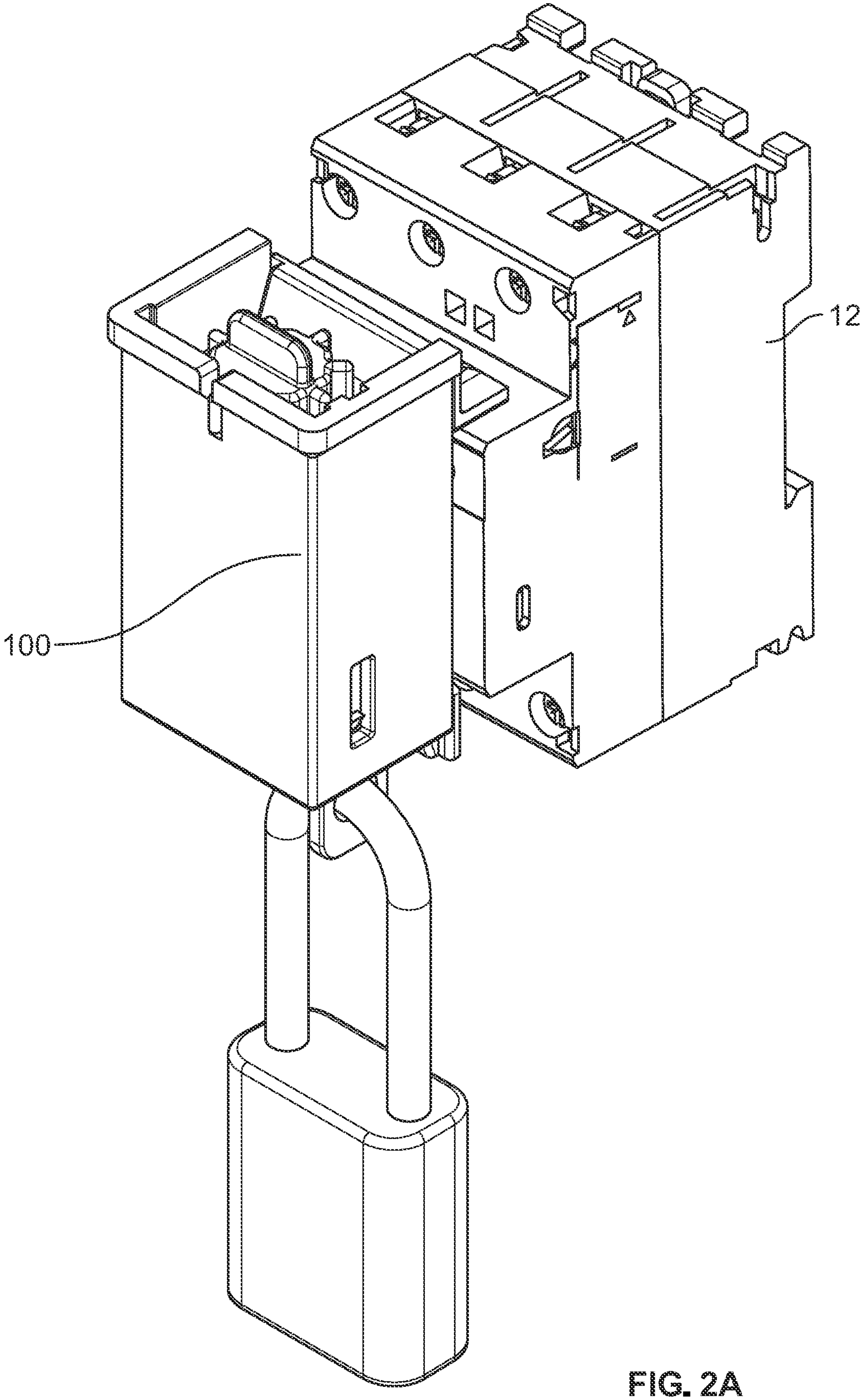
FIG. 2A is a front, left side isometric view of the rotary circuit breaker lockout device of FIG. 1 engaged with and fully locking out the circuit breaker with a lock.
Figure 2B:
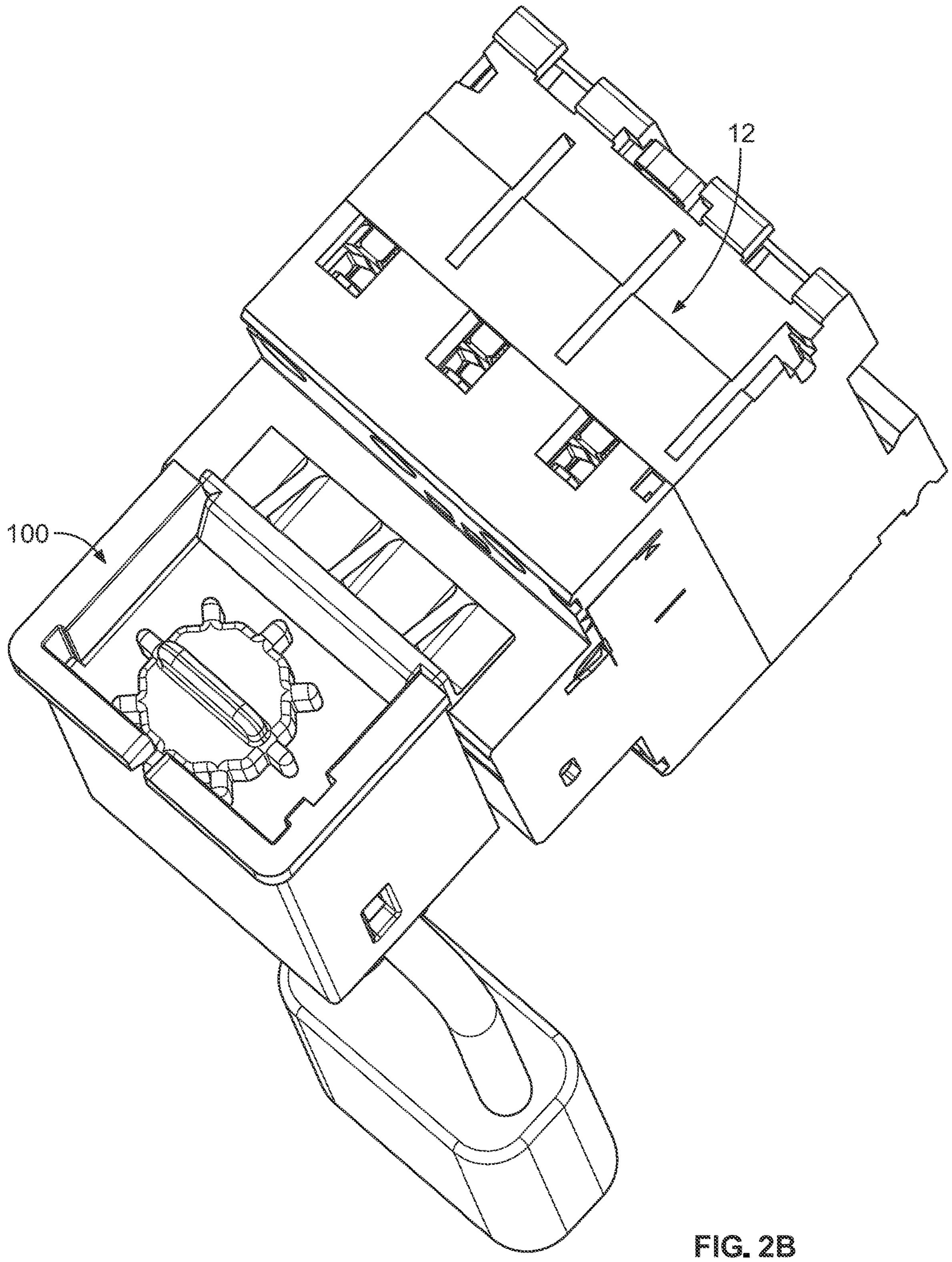
FIG. 2B is a top, left side isometric view of the rotary circuit breaker lockout device of FIG. 2A.
Figure 2C:
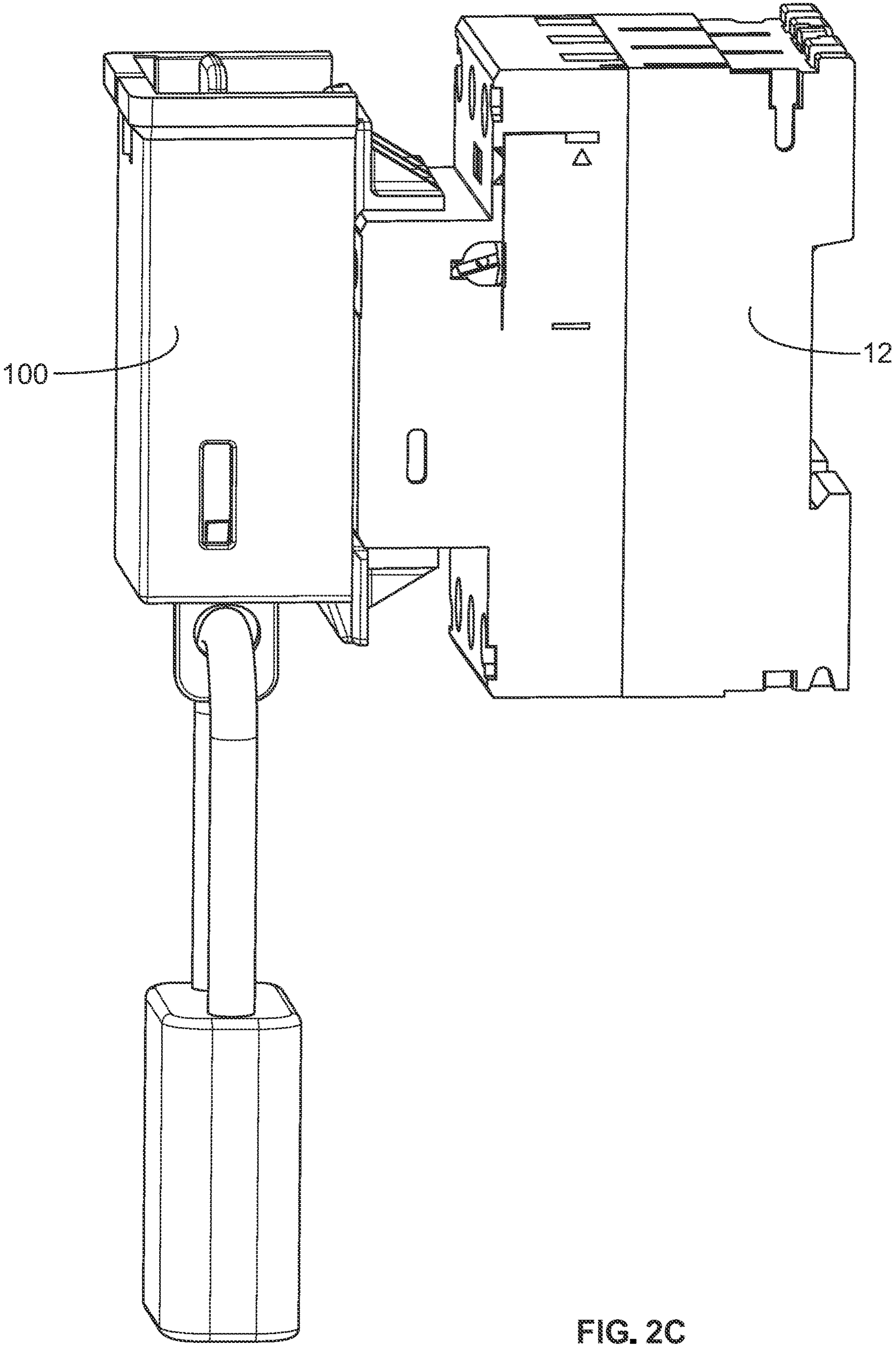
FIG. 2C is a left side isometric view of the rotary circuit breaker lockout device of FIG. 2A.
Figure 2D:
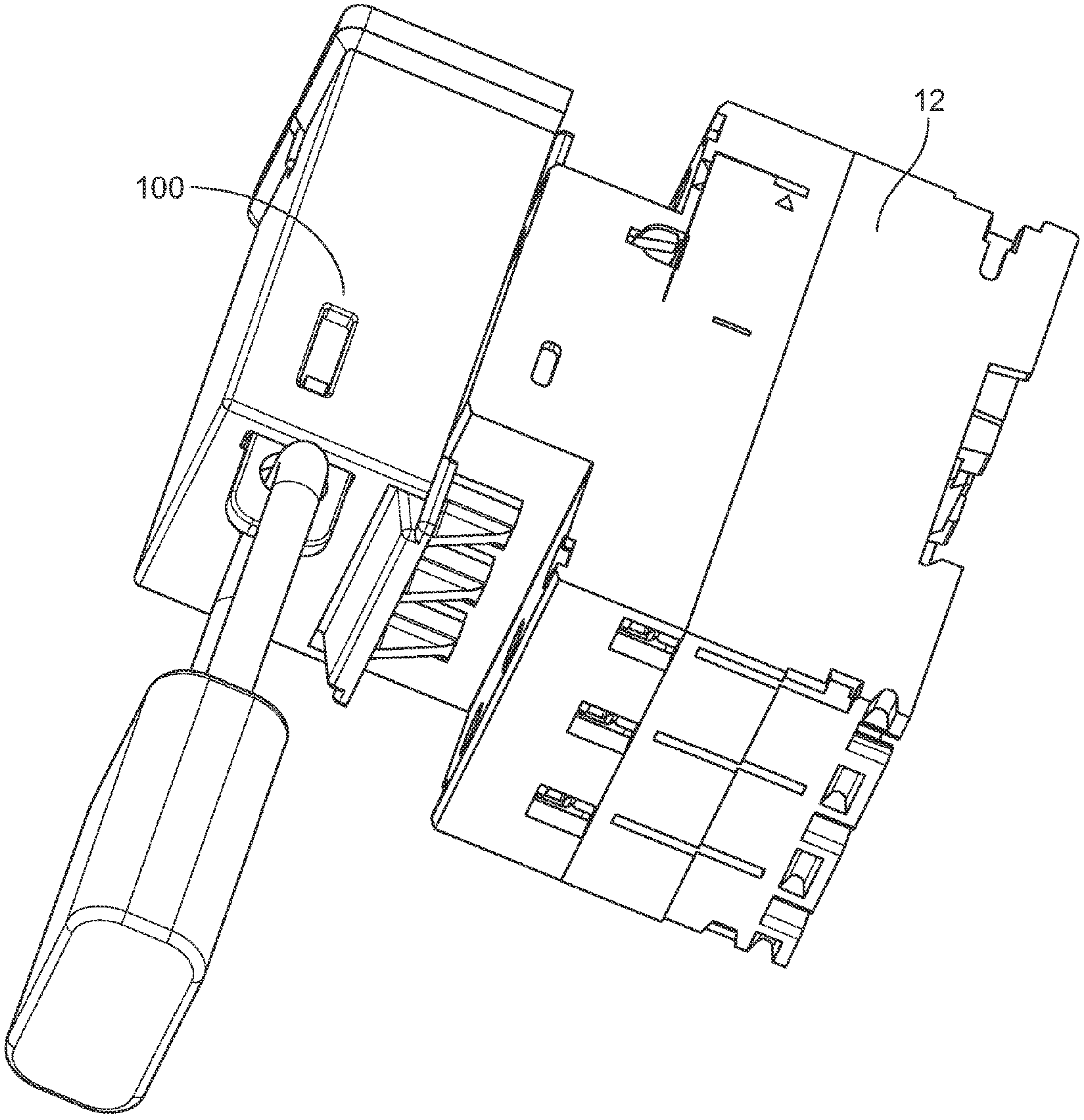
FIG. 2D is a bottom, left side isometric view of the rotary circuit breaker lockout device of FIG. 2A.
Figure 3:
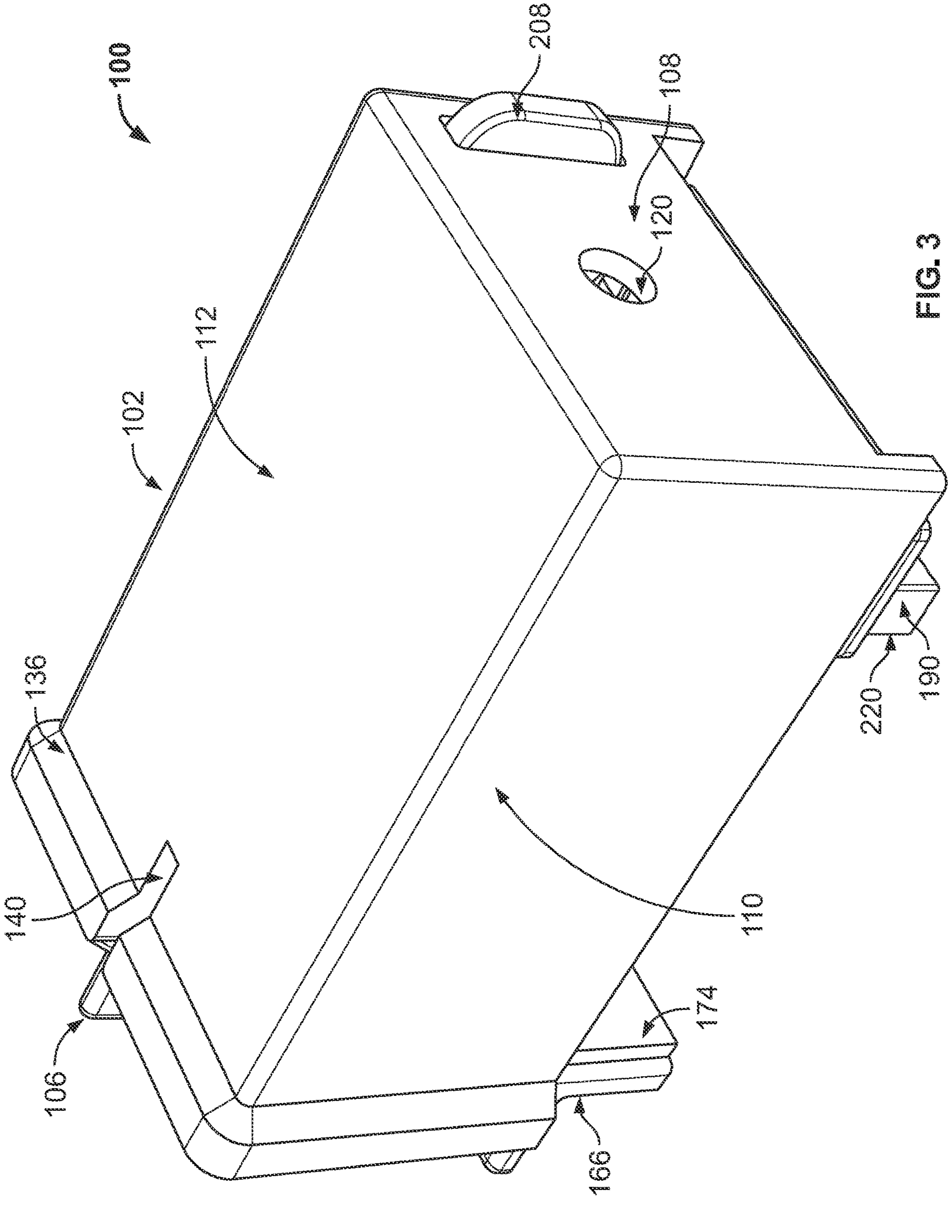
FIG. 3 is a bottom, right side further isometric view of the rotary circuit breaker lockout device of FIG. 1.
Figure 4:
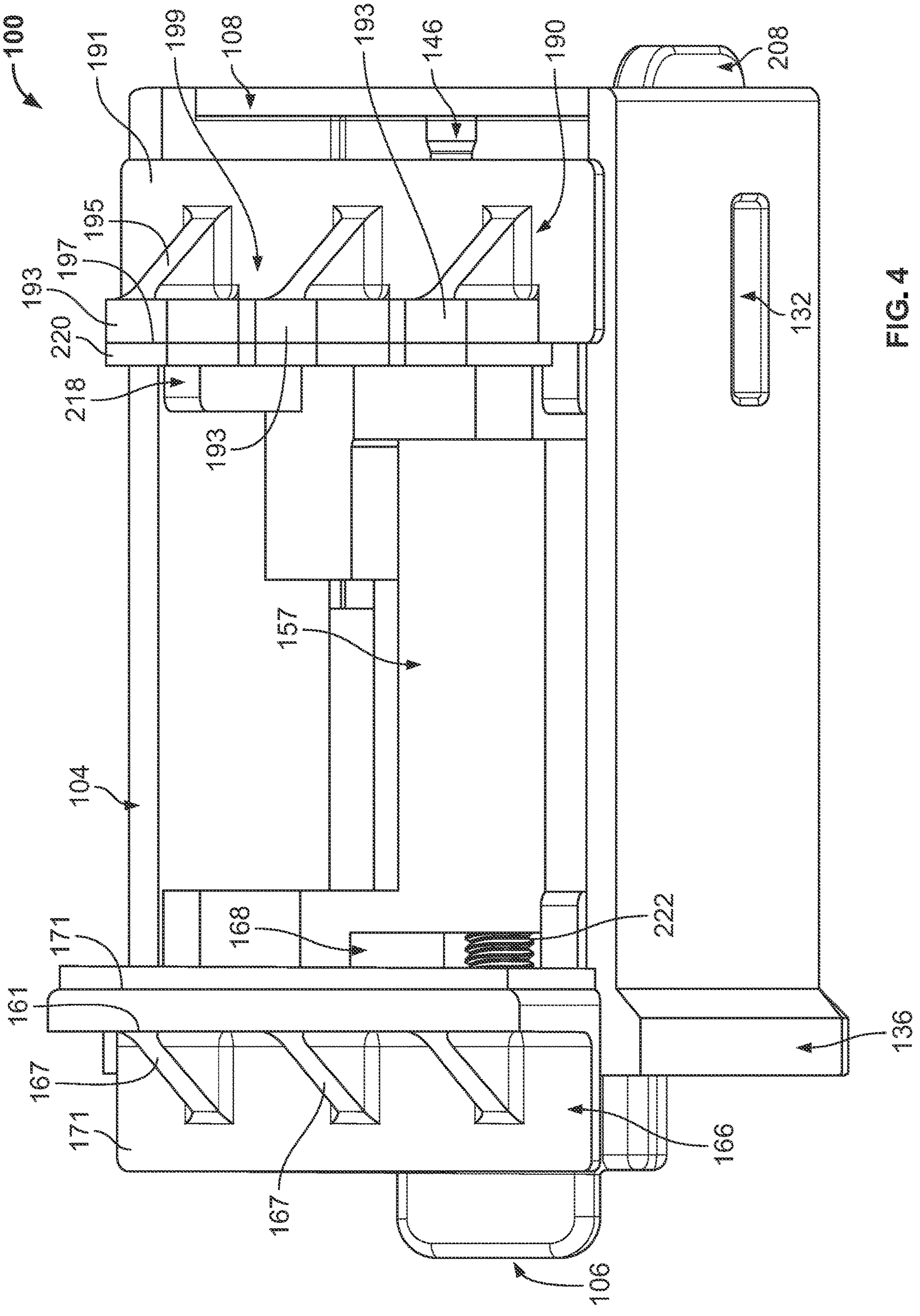
FIG. 4 is a rear, left side isometric view of the rotary circuit breaker lockout device of FIG. 1.
Figure 5:
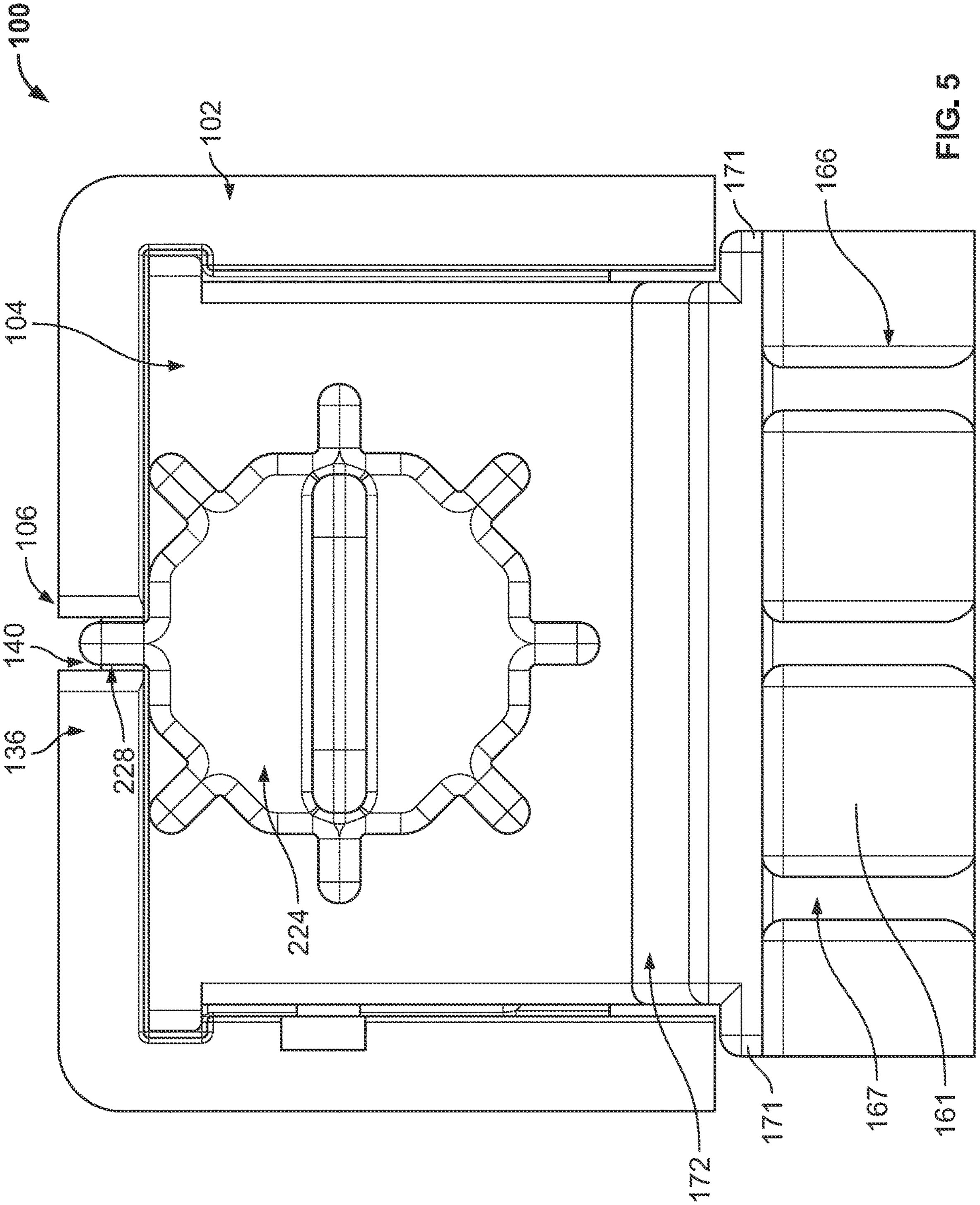
FIG. 5 is a top elevational view of the rotary circuit breaker lockout device of FIG. 1.
Figure 6:
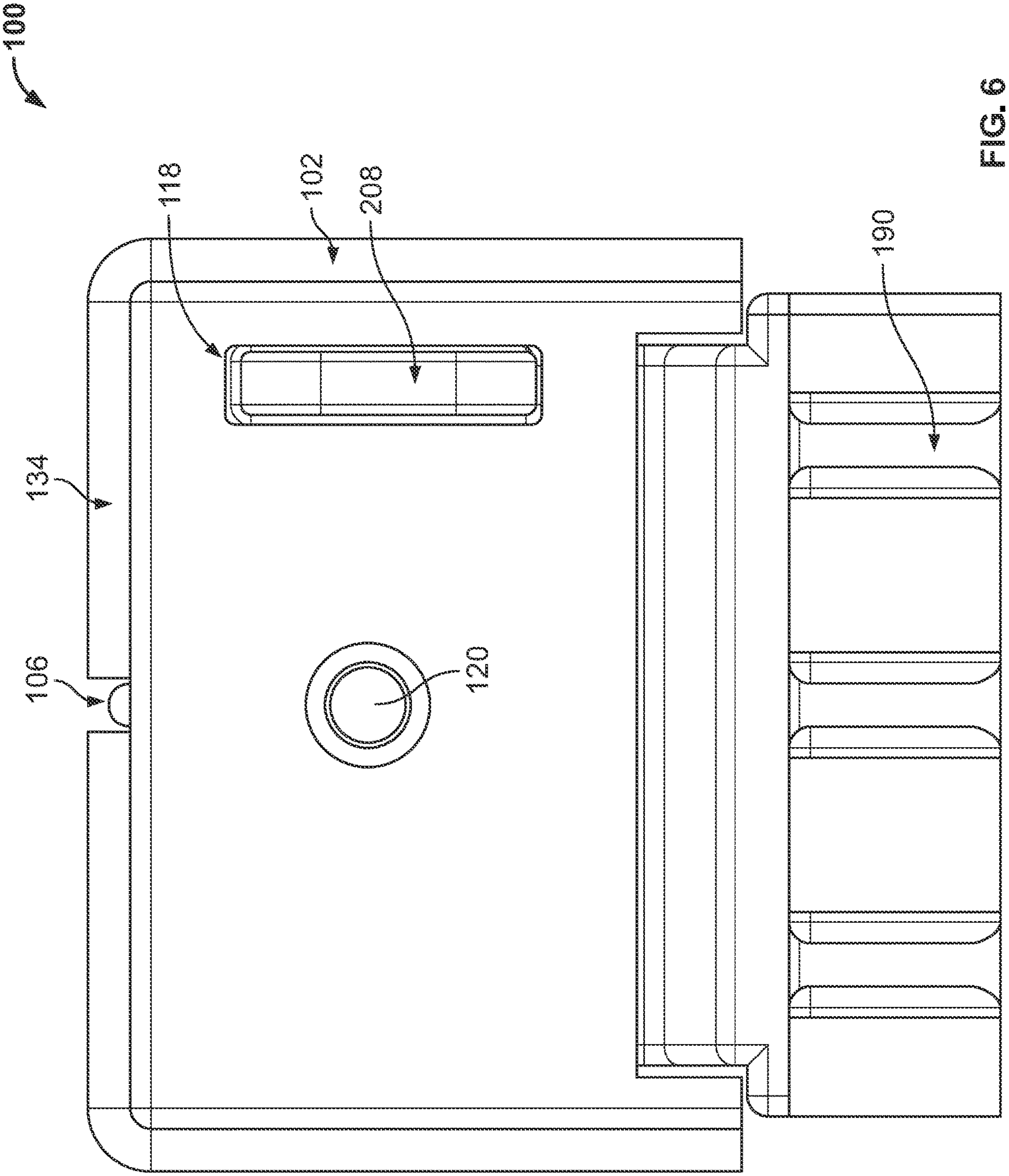
FIG. 6 is a bottom elevational view of the rotary circuit breaker lockout device of FIG. 1.

In one embodiment, each gripping projection 193 is provided in the form of a rectangular flange. Moreover, as shown in FIG. 2, each gripping projection 193 may have at least one optional support element 195 and a grip surface 197 opposite the support element 195. Also as shown in FIG. 2, there may be a plurality of gripping projections (e.g., three gripping projections) 193 with a space or a void 199 extending between each gripping projection.

In an alternative embodiment (not shown), the gripping projection 193 may be substantially similar to the gripping projection 161 and be a substantially solid projection with no voids. In further embodiments, the second engagement component 190 may have any number of projections 191 designed to engage at least a portion of the circuit breaker housing 16 and/or the circuit breaker switch 14. Also in further embodiments, the second engagement component 190 and/or projections 191 may be provided in the form of a different size and/or a different shape.

Figure 20A:
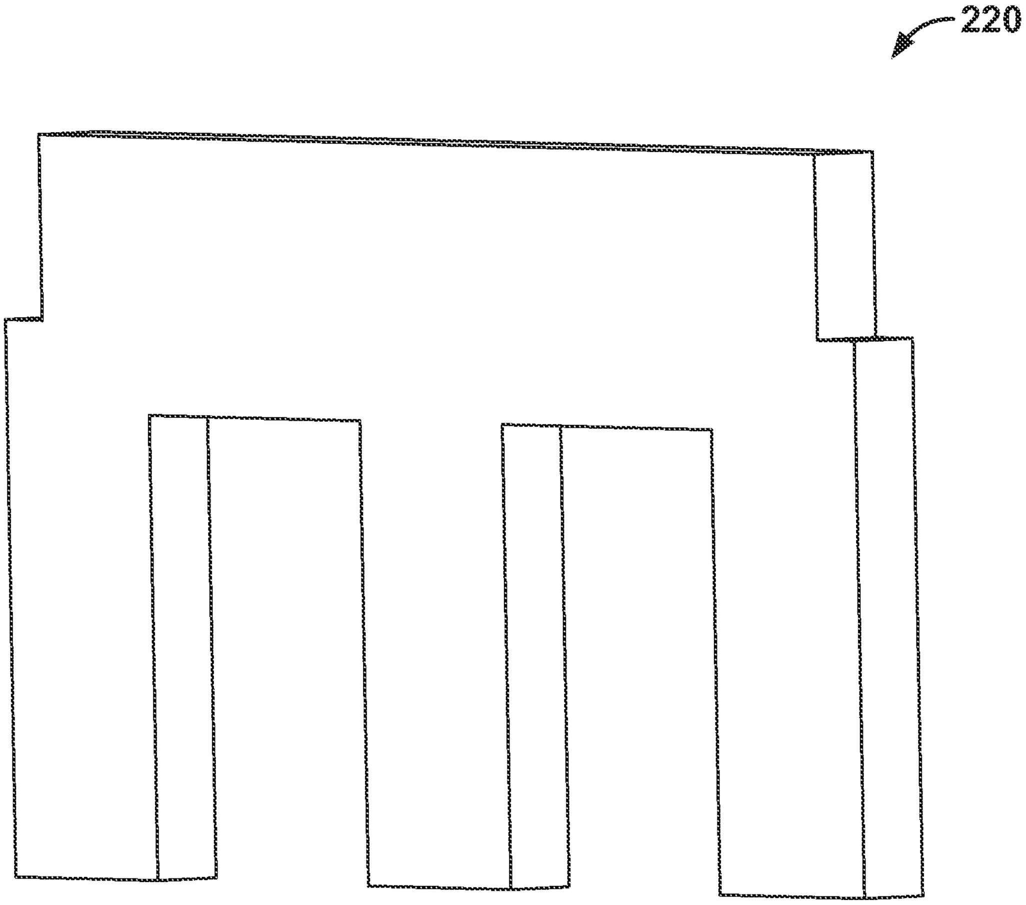
FIG. 20A is an isometric view of a plate for use with the second component of the inner housing of FIG. 20.

As shown in FIGS. 20A and 26, an optional plate 220 (e.g., a second plate) may couple to the surface(s) 197 of at least one gripping projection 193 and/or the second engagement component 190 to increase the gripping capability of the second engagement component 190 and/or the inner housing 104 to at least a portion of the circuit breaker 12. The plate 220 may be provided in the form of with a plurality of rectangular flanges that correspond in shape and size with the projections 193 and/or the spaces 199 of the second engagement component 190. The plate 220 may be provided in the form of at least one of a metal material, rubber, grip tape, sandpaper, or another material that facilitates the holding force, and/or any combination thereof.

Figure 21:
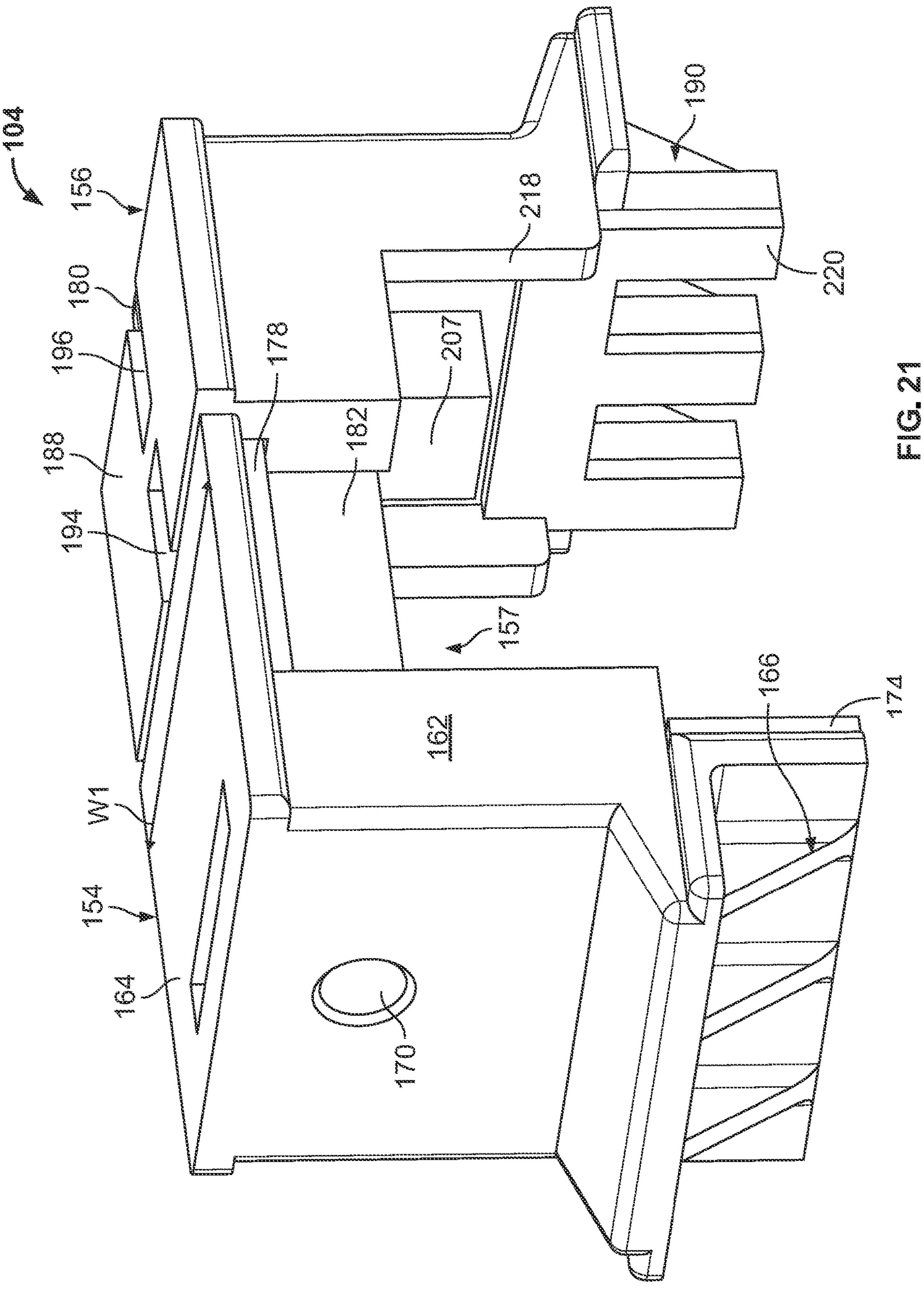
FIG. 21 is a top, right isometric view of the first component and the second component of the inner housing of FIGS. 15 and 18.
Figure 22:
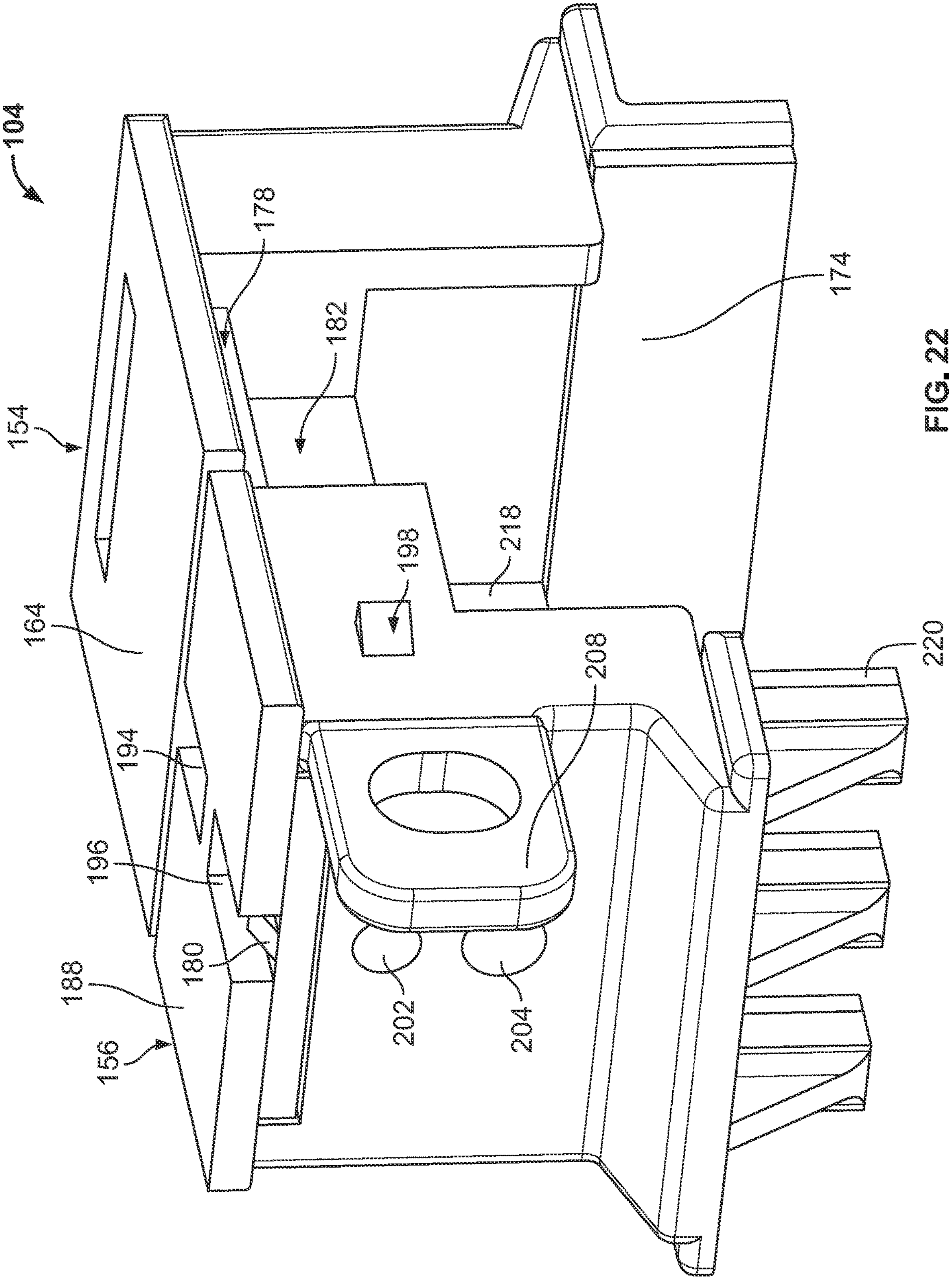
FIG. 22 is a bottom, left isometric view of the first component and the second component of FIG. 21.

As shown in FIGS. 21 and 22, the first component 154 and the second component 156 are designed to engage with one another to form the inner housing 104 and to form the recess 157 to receive at least a portion of the switch 14 therein. In one embodiment, the top platform 188 of the second component 156 may have substantially the same width dimension W1 as the platform 164 of the first component 154. Also, as shown, the platform 178 of the first component 154 is sized to fit within the channel 200 of the second component 156, and the platform 178 has a width dimension W2 (shown in FIG. 17) that is less than the width dimension W1 of the platform 188. The platform 182 of the first component 154 is sized to fit within a portion of the body 186, and the platform 182 has a width dimension W3 (shown in FIG. 17) that is less than width dimension W1 of the platform 188 and width dimension W2 of the platform 178. Also, as shown in FIGS. 21 and 22, the platform 182 is designed to abut the stopping element 207 when the first component 154 and the second component 156 are coupled together. Further, as described in more detail herein, the projection 180 of the first component 154 is designed to engage at least a portion of the slot 196 of the second component 156, and the opening 170 of the first component 154 is (e.g., axially) aligned with the opening 202 of the second component 156 when the first component 154 and the second component 156 are coupled together.

Figure 23:
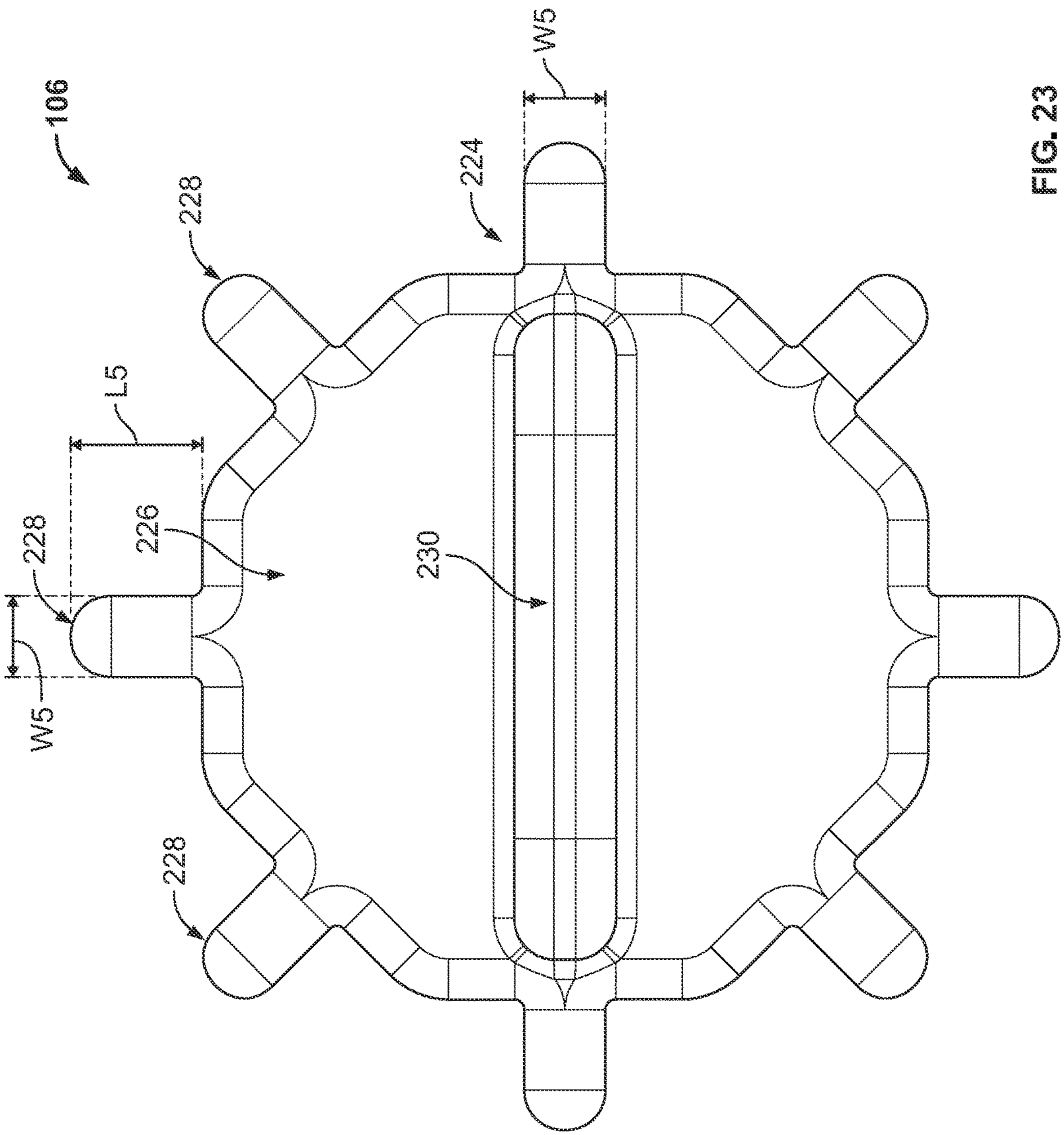
FIG. 23 is a top elevational view of a thumbwheel of the rotary circuit breaker lockout device of FIG. 1.
Figure 24:
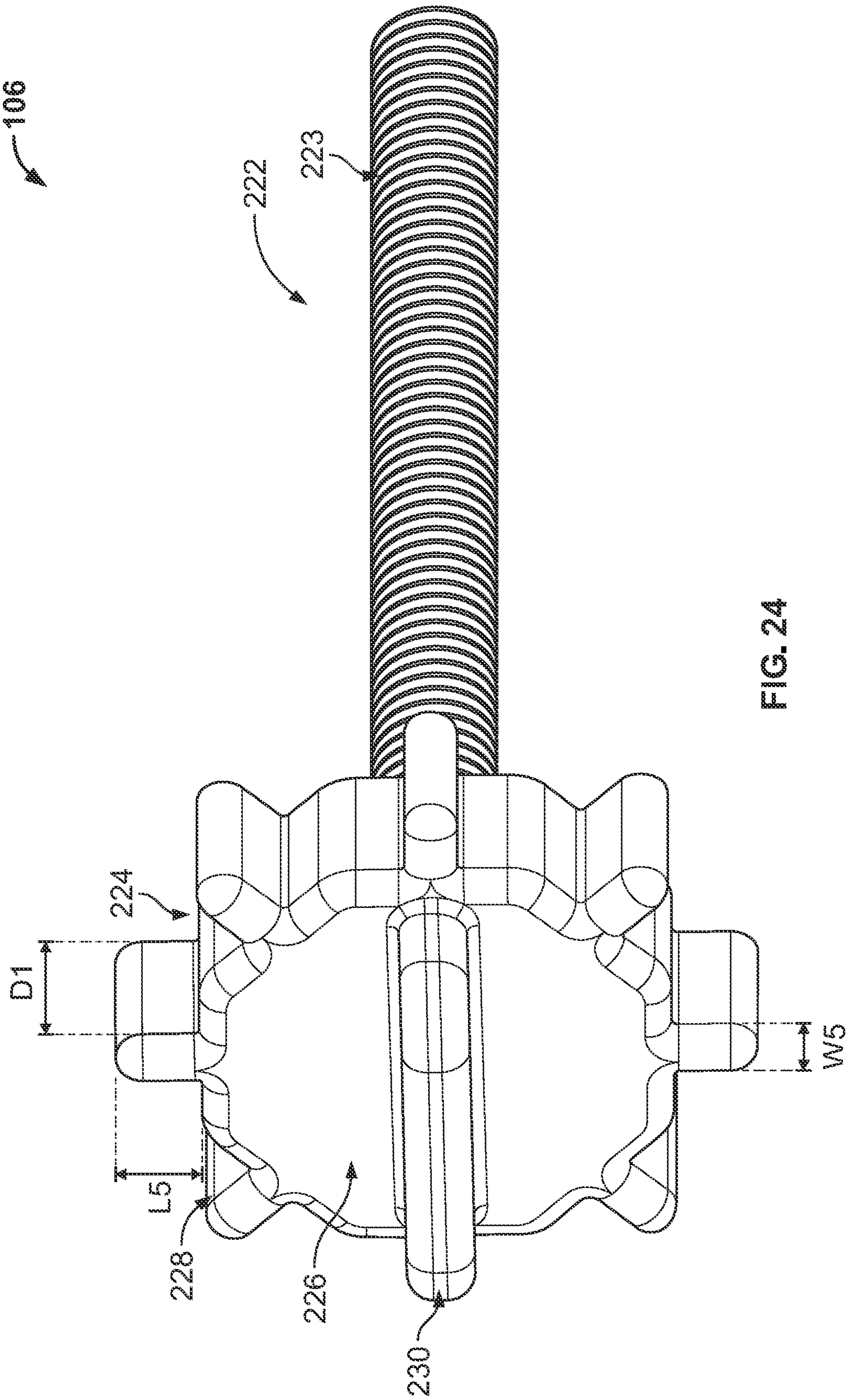
FIG. 24 is a top, right isometric view of a screw with the thumbwheel of FIG. 23.
Figure 25:
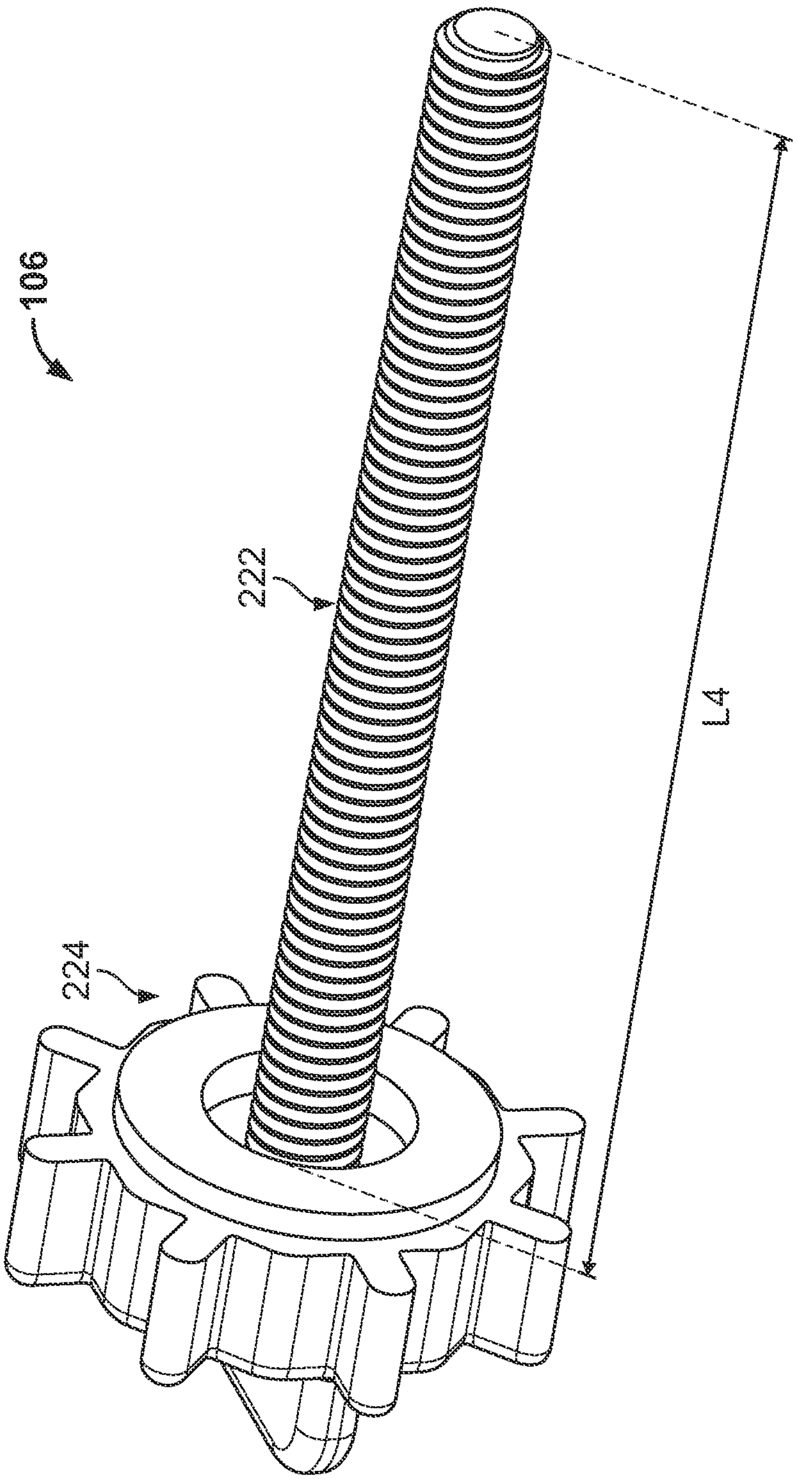
FIG. 25 is a bottom, right isometric view of a screw with the thumbwheel of FIG. 23.

Turning to FIGS. 23-25, the fastener 106 is depicted. The fastener 106 may be provided in the form of a cylindrical screw 222 having threads 223 circumscribing the length of its body, and a head or thumbwheel 224 coupled to at least one end of the screw 222. The screw 222 has a length dimension L4 (shown in FIG. 25) that may be as long as the axial length L1 or may be less than the axial length L1 of the first side wall 110 of the outer housing 102.

In one embodiment, the thumbwheel 224 is provided in the form of a base 226 with a plurality of tabs or projections 228 extending (e.g., radially) outwardly therefrom, wherein at least one projection 228 may engage the slot 134 in the sidewall 112 of the outer housing 102 and/or the collar 136 of the outer housing 102 (as shown in FIGS. 13 and 14). The projection 228, when engaged with the slot 134, is designed to maintain the lockout device 100 in a locked position. As shown in FIGS. 23 and 24, each projection 228 has a length dimension L5 and a width dimension W5 and a depth dimension D1. In one embodiment, the length dimension L5 may be less than or equal to length dimension L3 of the slot 134. Alternatively, the length dimension L5 of one or more projections 228 may be greater than the length dimension L3 of the slot 134. Also, the length dimension L5 of one or more of the projections 228 may be less than or equal to the height dimension H4 of the collar 136 of the outer housing 102. Alternatively, the length dimension L5 of one or more of the projections 228 may be greater than the height dimension H4 of the collar 136. Further, the width dimension W5 of one or more projections 228 may be equal to or less than the width W4 dimension of the slot 134. Alternatively, the width dimension W5 of one or more projections 228 may be greater than the width W4 dimension of the slot 134. Additionally, the depth dimension D1 of one or more of the projections 228 may be less than or equal to the length dimension L3 of the slot 134. Alternatively, the depth dimension DI of one or more of the projections 228 may be greater than the length dimension L3 of the slot 134.

As shown in FIG. 23, the base 226 of the fastener 106 has a substantially octagonal shape with eight projections spaced equally apart and extending outward therefrom; however, in alternative embodiments, the thumbwheel 224 has any shape and any number of projections extending outward therefrom. In one embodiment, each projection 228 has substantially the same width W5 and has substantially the same length L5 with respect to each other. Moreover, as shown in FIG. 23, the base 226 has an optional handle 230 extending (e.g., axially) between at least two projections 228. The handle 230 is designed to enable a user to grip and easily turn and/or rotate the fastener 106 to move the inner housing 104 between the disengaged position (shown in FIG. 1) and the engaged position (shown in FIG. 11) within the outer housing 102 and to facilitate engaging the rotary circuit switch 14.

The fastener 106 is designed to be received in and extended through a portion of either one or both of the first component 154 and/or the second component 156 of the inner housing 104 and further may be received in and extended through a portion of the outer housing 102. More specifically, during use, the fastener 106 is designed to be inserted and extended through the opening 170 in the first component 154 of the inner housing 104 and continue through the opening 202 in the second component 156 of the inner housing 104. In one embodiment, the fastener 106 is designed to compressively engage the first component 154 and the second component 156 to engage and/or disengage a rotary circuit breaker switch 14.

Figure 27:
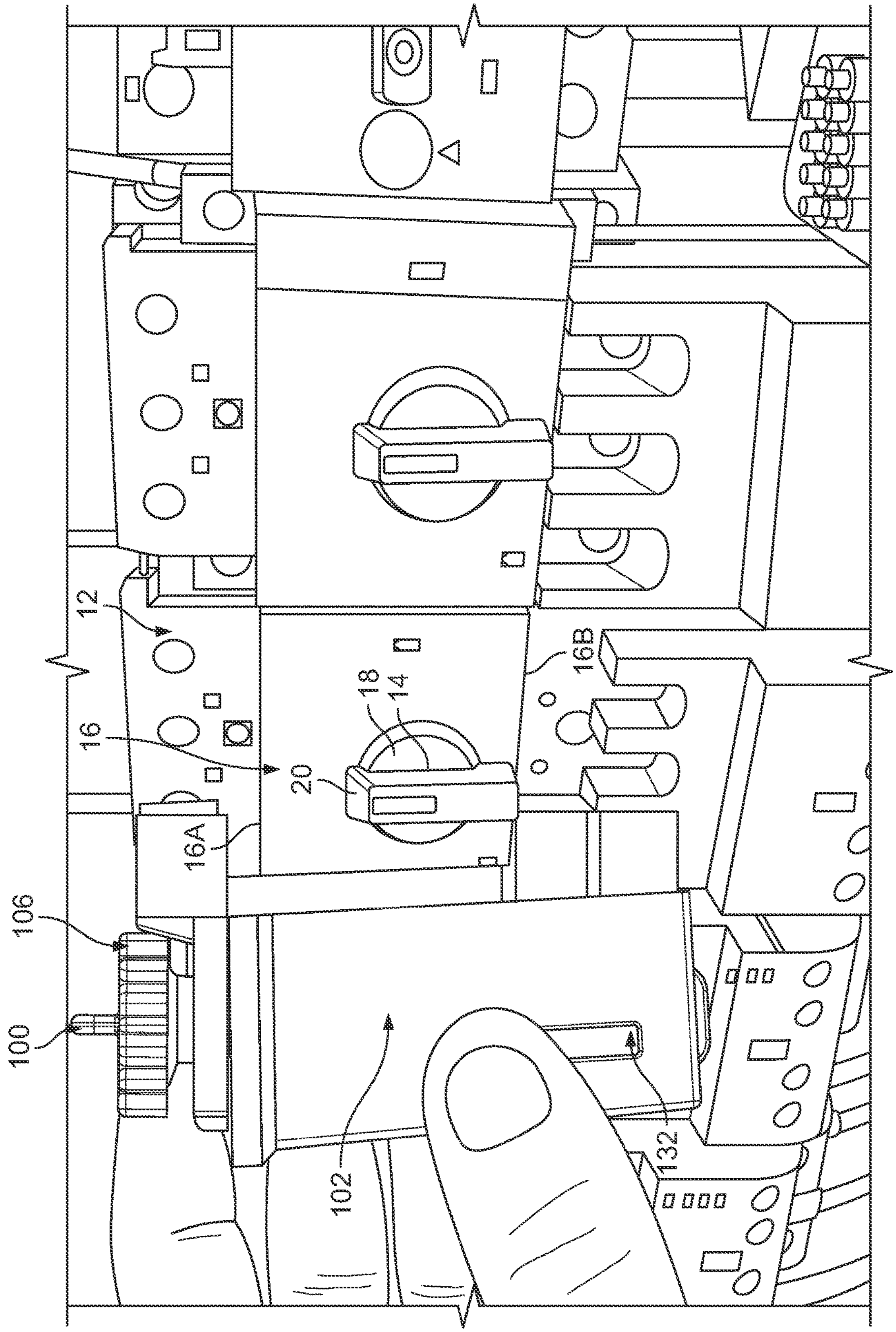
FIG. 27 is an isometric view of the rotary circuit breaker lockout device with the lock of FIG. 1 removed from the circuit breaker of FIG. 1A.
Figure 28:
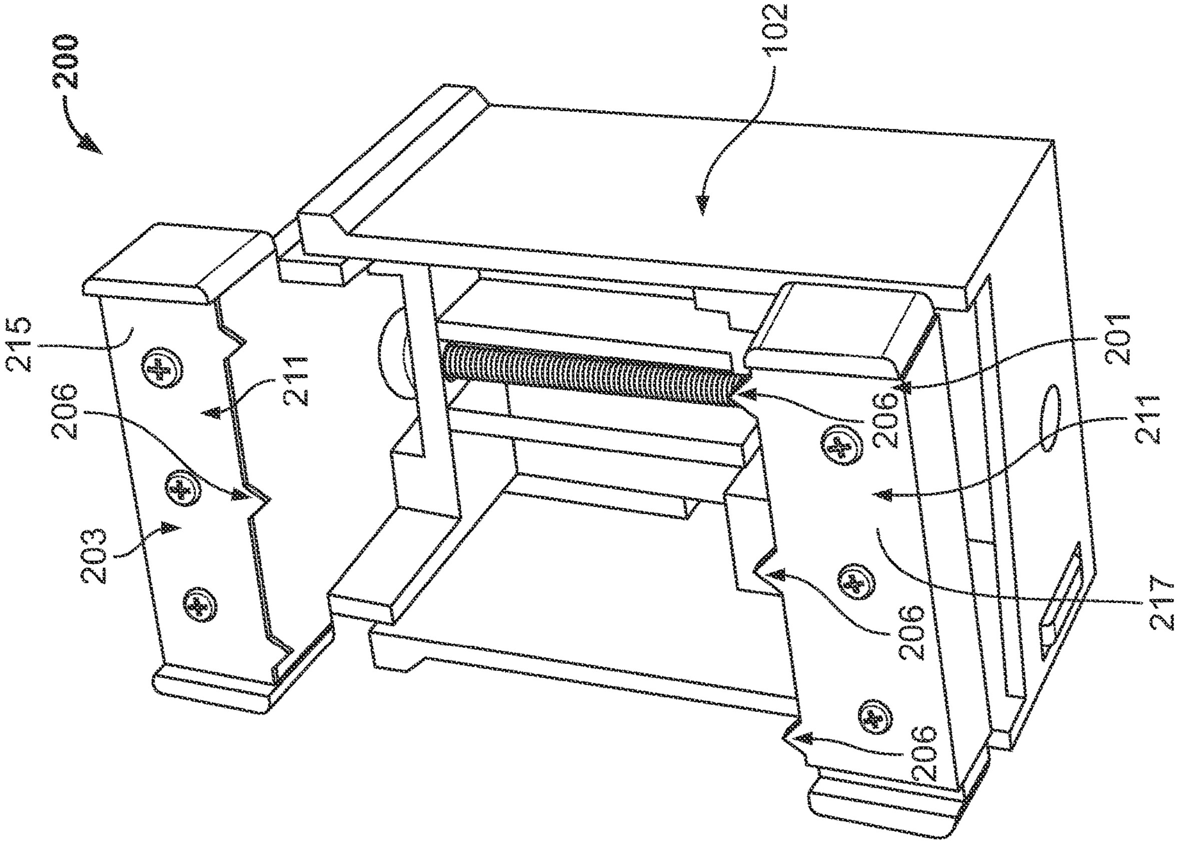
FIG. 28 is an isometric view of another embodiment of a rotary circuit breaker lockout device.

Turning to FIGS. 27 and 28, an alternative embodiment of the rotary circuit breaker lockout device 200 is provided. The device 200 is substantially the same as device 100; however, the first component 154 of the device 200 has a first component 203 provided in the form of a first block 215 rather than the engagement component 166. Moreover, the second component 156 of the device 200 has a second component 201 provided in the form of a second block 217 rather than the second engagement component 190. In one embodiment, the first block 215 is substantially the same as the second block 217. Additionally, each of the first component 203 and the second component 201 may have a plurality (e.g., three) of jagged pointed triangular projections 206 that extend from a substantially rectangular body 211. The body 211 and the projections 206 facilitate a gripping engagement with various shaped circuit breakers, such as the circuit breaker 12.

With the individual components described above and with additional reference to FIG. 26, the assembly of the lockout device 100 and further the function of the lockout device 100 are described hereinbelow. In its resting not fully engaged (e.g., open) configuration shown in FIG. 1, the inner housing 104 is received within the cavity 116 of the outer housing 102.

To assemble the lockout device 100, the first component 154 is coupled to the second component 156 to receive at least a portion of the rotary circuit breaker switch 14 therein (e.g., within the recess 157). More specifically, as shown in FIGS. 21 and 22, the platform 164 of the first component 154 and the platform 188 of the second component are (e.g., axially) aligned, and the platform 178 of the section 160 of the first component 154 is inserted into (e.g., received within) the channel 200 of the second component 156, aligning (e.g., axially) the opening 170 of the first component 154 with the opening 202 of the second component 156 such that the fastener 106 may be inserted through the opening 170 and/or through the opening 202. In one embodiment, the platform 182 abuts the stopping element 207 when coupling the first component 154 and second component 156 together.

Additionally, as shown in FIGS. 21 and 22, when coupling the first component 154 and the second component 156, the projection 180 may travel within the slot 194, be pressed downward (e.g., move from a first shown erect position to a second depressed position (not shown) that is substantially flat with the platform 188), and slide along the body section 184 until the projection 180 extends into and engages at least a portion of the perimeter of the slot 196 (e.g., wherein the projection 180 returns back to the first shown erect position). As shown, the projection 180 within the slot 196 facilitates coupling the first component 154 and the second component 156 to one another. The projection 180 limits the (e.g., axial) movement of the inner housing 104 within the outer housing 102.

To couple or mate the outer housing 102 with the inner housing 104, the opening 170 of the first component 154 and the opening 202 of the second component 156 are (e.g., axially) aligned with the opening 120 of the outer housing 102 to receive the fastener 106 therein. The platform 164 of the section 160 of the first component 154 and the platform 188 of the body 186 of the second component 156 are guided by and received within the channels 122 of the outer housing 102.

The tab 208 of the first component 154 extends into and engages the perimeter of the channel 118 (although only a portion of the tab 208 extends beyond the base wall 108) to prevent further removal of the inner housing 104 out of the cavity 116 of the outer housing 102, particularly in the axial direction.

The biasing element 109 is received around the support structure 146 of the outer housing 102 and within the opening 204 and/or within a portion of the stopping element 207, and the biasing element 109 contacts the outer housing 102, specifically the base wall 108, to bias and/or translate the inner housing 104 (e.g., the first component 154 and/or the second component 156) within the outer housing 102 and away from the base wall 108 of the outer housing 102.

In continuing to assemble the lockout device 100, the projection 198 may travel within and through the groove 128, be pressed downward (e.g., move from a first shown erect position to a second depressed position (not shown) that is substantially flat with the surface of the side wall 114), slide along the side wall 114 until the projection 198 extends into and engages at least a portion of the perimeter of the window 132 (e.g., wherein the projection 198 returns back to the first shown erect position). As shown, the projection 198 within the window 132 facilitates coupling the inner housing 104 to the outer housing 102 and further limits the (e.g., axial) movement of the inner housing 104 and outer housing 102 with respect to one another.

Alternatively, rather than coupling the first component 154 and the second component 156 together and then inserting the inner housing 104 into the outer housing 102, the second component 156 of the inner housing 104 may be inserted into the outer housing 102 until the tab 208 is inserted into the window 118, and then the first component 154 of the inner housing 104 may be inserted into the outer housing 102 and coupled to the second component 156 that is already within the outer housing 102. After the first component 154 and the second component 156 are coupled together within the outer housing 102, the fastener 106 may be inserted into and extend through at least one of the first component 154, the second component 156, and the outer housing 102.

As best seen in FIGS. 1-11 and FIG. 26, the fastener 106 is used to couple the first component 154 of the inner housing 104, the second component 156 of the inner housing 104, and/or the outer housing 102 together. The screw 222 of the fastener 106 is inserted through the opening 120 in the outer housing 102, the opening 170 of the first component 154, and/or the opening 202 of the second component 156, and further the screw 222 may engage at least one of the body 162 and/or the platform 182 of the first component 154, and the stopping element 207 of the second component 156.

When the fastener 106 is inserted in the inner housing 104 and the outer housing 102. at least a portion of the thumbwheel 224 engages at least one surface 163 of the body 162 of the first component 154 of the inner housing 104 and extends beyond the collar 136 of the outer housing 102. The thumbwheel 224 abuts at least a portion of the sidewall 112, the collar 136, and/or the notch 140. More specifically, as shown in at least FIG. 5, at least one of the projections 228 of the thumbwheel 224 is positioned within the notch 140 of the collar 136 and engages at least a portion of the perimeter of the slot 134 of the outer housing 102.

Turning to the use of the lockout device 100, the lockout device 100 can be secured to the circuit breaker 12 by first locating and engaging the rotary circuit switch 14 of the circuit breaker 12 and positioning the switch 14 in between the first component 154 and the second component 156 of the inner housing 104 (e.g., positioning the switch 114 within the recess 157). The surface 176 of the engagement component 166 of the first component 154 of the inner housing 104 and/or the plate 174 can contact the surface 16A of the switch body 16, and the surface 216 of the second engagement component 190 of the second component 156 of the inner housing 104 and/or the plate 220 can contact the surface 16B of the switch body 16. The engagement component 166 and/or the second engagement component 190 facilitate engagement of the lockout device 100 to the circuit breaker body 16, as the bottom of the circuit breaker 12 (as shown in FIGS. 27 and 28) has a shape with U-shaped openings.

The thumbwheel 224 of the fastener 106 is turned (e.g., rotated), using the handle 230, to move the inner housing 104 with respect to the outer housing 102. The outer housing 102 is urged (e.g., upward or axially (e.g., axis X in FIG. 11)) relative to the inner housing 104 against the biasing element 109. The channels 122 and/or the groove 128 (e.g., guides or bearing surfaces) formed between the outer housing 102 and the inner housing 104 constrain the motion of the outer housing 102 relative to the inner housing 104 and cause the outer housing 102 to translate axially.

The thumbwheel 224 is turned further until a surface (such as a surface 209) of the stopping mechanism 207 engages the rotary switch 14 and/or until at least one projection of the thumbwheel 224 engages the slot 134 in the outer housing 102 to prevent rotation of the thumbwheel 224. The outer housing 102 is blocked from movement when the projection 228 is inserted into and engages the slot 134. The thumbwheel 224 advantageously allows for the lockout device 100 to couple to many arrangements of rotary circuit breaker switches 14, as the thumbwheel 224 and the fastener 106 allow for precision and control over the tightening of the lockout device 100.

Additionally, when the outer housing 102 translates (e.g., axially), the projection 198 extends into and engages at least a portion of the perimeter of the window 132 exposing at least a portion of the projection 198 within the side wall 114. The projection 198 also constrains the motion of the outer housing 102 relative to the inner housing 104.

The tab 208 of the second component 156 of the inner housing 104 extends further through the channel 118 formed through the base wall 108 of the outer housing 102, exposing some or all of the lock receiving aperture 210 of the tab 208. An operator can pass the shackle of a lock (not shown) through the lock receiving aperture 210 to prevent the removal of the lockout device 100.

Once the lockout device 100 is properly secured to the circuit breaker 12, the lockout device 100 can be "locked" to prevent any unwanted tampering or movement of the device that could affect the lockout device's 100 ability to maintain the switch 14 and/or the circuit breaker 12 in an engaged position to prevent current from flowing through the circuit breaker 12.

Using the lockout device 100 described herein, it is possible to secure and lock out several different sizes and shapes of circuit breakers 12. The lockout device 100 can be quickly coupled and uncoupled (e.g., removed) to a circuit breaker 12 by hand, and may not require any tools to operate, which can greatly improve efficiency and decrease necessary inventory within a warehouse or factory.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A lockout device for securing a rotary circuit breaker switch, the lockout device comprising:

an outer housing having a plurality of side walls extending away from a base wall to define a cavity, at least one of the plurality of side walls having a slot formed therein;

an inner housing received within a portion of the cavity, the inner housing having a first component and a second component positioned apart from one another to receive the rotary circuit breaker switch therein, and the inner housing having a tab formed on one end of the inner housing that extends into a channel formed through the base wall of the outer housing, the tab having an opening configured to receive a lock therein;

a biasing element positioned between the base wall and the inner housing to translate the inner housing axially relative to the outer housing; and a fastener designed to be positioned within the slot of the outer housing to orient the lockout device in a locked position.

2. The lockout device according to claim 1, further comprising a support structure extending upwardly from the base wall of the outer housing and configured to engage the biasing element.

3. The lockout device according to claim 1, wherein the inner housing has a projection configured to engage a perimeter of a window formed within at least one of the plurality of side walls of the outer housing, the projection being received within the window to constrain motion of the outer housing relative to the inner housing.

4. The lockout device according to claim 1, wherein the fastener includes a round thumbwheel with a plurality of projections extending outwardly therefrom, and the thumbwheel includes a tab to facilitate rotating the fastener.

5. The lockout device according to claim 1, wherein at least one of the plurality of side walls has a channel formed therein to receive the inner housing and facilitate translating the outer housing with respect to the inner housing.

6. A lockout device for securing a rotary switch of a circuit breaker, the circuit breaker having a body with an upper surface and a lower surface and the lockout device comprising:

an outer housing defining a cavity, at least the outer housing having a slot formed therein;

an inner housing received within a portion of the cavity, the inner housing having a first set of gripping projections configured to grip the upper surface of the body of the circuit breaker and a second set of gripping projections configured to grip the lower surface of the body of the circuit breaker, wherein the first set of gripping projections and the second set of gripping projections are positioned apart from one another to receive the rotary switch of the circuit breaker therein; and a fastener with a thumbwheel having at least one projection configured to be positioned within the slot of the outer housing to hold the lockout device in a locked position.

7. The lockout device according to claim 6, further comprising a first plate configured to couple to the first set of gripping projections, and a second plate configured to couple to the second set of gripping projections to facilitate gripping the inner housing to the circuit breaker.

8. The lockout device according to claim 7, wherein at least one of the first plate and the second plate is fabricated of at least one of a metal material, rubber, grip tape, sand paper, or combinations thereof.

9. The lockout device according to claim 8, wherein at least one of the first set of gripping projections or the second set of gripping projections comprises at least three substantially rectangular flanges.

10. The lockout device according to claim 6, wherein the inner housing further comprises a tab formed on one end of the inner housing, whereby the tab extends into a channel formed through the outer housing when the inner housing and the outer housing are at least partially engaged, and the tab has a lock receiving aperture therethrough, and the lock receiving aperture is sized to receive a padlock.

11. The lockout device of claim 10, wherein the outer housing is movable relative to the inner housing against a biasing element between an open position and a closed position, the tab extending through the channel axially further in the closed position than in the open position.

12. The lockout device according to claim 6, wherein the inner housing has a tab configured to engage a perimeter of a window formed within the outer housing and the tab designed to limit axial movement of the outer housing with respect to the inner housing.

13. The lockout device according to claim 12, wherein the tab is imparted with a substantially triangular shape.

14. The lockout device according to claim 6, wherein the fastener further includes a cylindrical screw having threads circumscribing a length of the cylindrical screw, and the thumbwheel is coupled to one end of the cylindrical screw.

15. The lockout device according to claim 6, wherein the thumbwheel is round with a plurality of projections extending outwardly therefrom, and the thumbwheel includes a handle to facilitate rotating the fastener.

16. The lockout device according to claim 6, wherein the outer housing includes a collar configured to strengthen the outer housing, and wherein the collar further engages the at least one projection of the thumbwheel.

17. The lockout device according to claim 6, wherein the outer housing includes a channel formed therein to engage at least a portion of the inner housing and facilitate translating the outer housing with respect to the inner housing.

18. The lockout device of claim 6, wherein the outer housing includes a plurality of side walls extending away from a base wall, and the lockout device further includes a support structure that protrudes outwardly through a portion of a biasing element to secure the biasing element to the outer housing.

19. A method of securing a rotary circuit breaker switch of a circuit breaker using a lockout device, the circuit breaker having an upper surface and a lower surface, the method comprising:

providing an outer housing having a plurality of side walls defining a cavity, at least one of the side walls having a slot formed therein;

positioning an inner housing within a portion of the cavity, the inner housing having a first component with a first set of gripping projections and a second component with a second set of gripping projections;

positioning the inner housing adjacent the body of the circuit breaker;

contacting the first set of gripping projections with an upper surface of the body of the circuit breaker;

engaging the second set of gripping projections with a lower surface of the body of the circuit breaker;

positioning the rotary circuit breaker switch within a switch receiving recess formed by the first component and the second component;

translating the outer housing axially relative to the inner housing via a spring; and rotating a fastener with a thumbwheel having a projection until the projection engages the slot of the outer housing to hold the fastener and the lockout device in a locked position.

* * * * *